United States Patent
Irvine et al.

(10) Patent No.: US 7,953,060 B2
(45) Date of Patent: May 31, 2011

(54) QUASISYNCHRONOUS RESERVATION REQUESTS

(75) Inventors: David Irvine, Carlsbad, CA (US); Donald W. Becker, Rancho Santa Fe, CA (US)

(73) Assignee: ViaSat, Inc., Carlsbad, CA (US)

( * ) Notice: Subject to any disclaimer, the term of this patent is extended or adjusted under 35 U.S.C. 154(b) by 259 days.

(21) Appl. No.: 12/134,637

(22) Filed: Jun. 6, 2008

(65) Prior Publication Data

US 2008/0304507 A1    Dec. 11, 2008

Related U.S. Application Data

(60) Provisional application No. 60/943,152, filed on Jun. 11, 2007.

(51) Int. Cl.
*H04B 7/216* (2006.01)
(52) U.S. Cl. .......................... 370/342; 370/320
(58) Field of Classification Search ............. 370/449, 370/320, 321, 335, 336, 342, 441, 442; 375/130–153
See application file for complete search history.

(56) References Cited

U.S. PATENT DOCUMENTS

| | | |
|---|---|---|
| 4,161,786 A | 7/1979 | Hopkins et al. |
| 4,593,282 A | 6/1986 | Acampora et al. |
| 4,774,707 A | 9/1988 | Raychaudhuri |
| 4,901,307 A * | 2/1990 | Gilhousen et al. ............ 370/320 |
| 5,172,375 A | 12/1992 | Kou |
| 5,239,677 A | 8/1993 | Jasinski |
| 5,465,253 A | 11/1995 | Rahnema |
| 5,530,842 A | 6/1996 | Abraham et al. |
| 5,570,355 A | 10/1996 | Dail et al. |
| 5,592,469 A | 1/1997 | Szabo |
| 5,644,576 A | 7/1997 | Bauchot et al. |
| 5,669,062 A | 9/1997 | Olds et al. |
| 5,737,335 A | 4/1998 | Mizuta et al. |
| 5,809,060 A * | 9/1998 | Cafarella et al. ............ 375/146 |

(Continued)

FOREIGN PATENT DOCUMENTS

EP    0282028 A1    9/1988

(Continued)

OTHER PUBLICATIONS

Teruo Kawamura et al. (Orthogonal Pilot Channel Using Combination of FDMA and CDMA in Single-Carrier FDMA-Based Evolved UTRA Uplink, IEEE, Mar. 11-15, 2007).*

(Continued)

*Primary Examiner* — Derrick W Ferris
*Assistant Examiner* — Mang Yeung
(74) *Attorney, Agent, or Firm* — Kilpatrick Townsend & Stockton LLP

(57) ABSTRACT

Methods and apparatuses are presented for communicating using a shared communication medium. A request is sent in a request signal space where the request represents a code sequence that is a member of a set of code sequences. Each member is characterized by an autocorrelation function that has a peak centered at zero time offset. Each member is further characterized by a cross correlation function. The cross correlation function has a low correlation window having a width and surrounding a zero time offset. An assignment is received that assigns the request to a transmission opportunity in a scheduled transmission signal space. The assignment is made in response to detecting the code sequence from receiving multiple requests having relative timing offsets less than the width of the low correlation window. A data transmission is sent using the assigned transmission opportunity in the scheduled transmission signal space.

20 Claims, 28 Drawing Sheets

U.S. PATENT DOCUMENTS

| | | | |
|---|---|---|---|
| 5,859,879 A | 1/1999 | Bolgiano et al. |
| 6,034,967 A | 3/2000 | Citta et al. |
| 6,252,885 B1 | 6/2001 | Yashiro et al. |
| 6,332,006 B1 | 12/2001 | Rydback et al. |
| 6,366,568 B1 | 4/2002 | Bolgiano et al. |
| 6,510,149 B1 | 1/2003 | Amtmann |
| 6,563,808 B1 | 5/2003 | Cox et al. |
| 6,567,661 B2 | 5/2003 | McDonnell et al. |
| 6,584,101 B2 | 6/2003 | Hagglund et al. |
| 6,590,885 B1 | 7/2003 | Jorgensen |
| 6,677,864 B2 | 1/2004 | Khayrallah |
| 6,680,929 B1 | 1/2004 | Lida et al. |
| 6,717,934 B1 | 4/2004 | Kaasila et al. |
| 6,735,217 B1 | 5/2004 | Webber, Jr. et al. |
| 6,738,350 B1 | 5/2004 | Gao et al. |
| 6,760,591 B1 | 7/2004 | Klinger |
| 6,778,515 B2 | 8/2004 | Bolgiano et al. |
| 6,785,251 B2 | 8/2004 | Bolgiano et al. |
| 6,804,207 B2 | 10/2004 | Bolgiano et al. |
| 6,842,444 B2 | 1/2005 | Bolgiano et al. |
| 6,847,626 B1 | 1/2005 | Carneal et al. |
| 6,985,455 B1 | 1/2006 | Heath et al. |
| 6,990,478 B2 | 1/2006 | Loy et al. |
| 7,024,582 B2 | 4/2006 | Loy et al. |
| 7,072,894 B2 | 7/2006 | Loy et al. |
| 7,111,291 B2 | 9/2006 | Loy et al. |
| 7,120,650 B2 | 10/2006 | Loy et al. |
| 7,143,131 B1 | 11/2006 | Soles et al. |
| 7,177,321 B2 | 2/2007 | Bae |
| 7,187,669 B1 | 3/2007 | Lee |
| 7,260,064 B2 | 8/2007 | Basu et al. |
| 7,330,487 B2 | 2/2008 | Chang et al. |
| 7,369,526 B2 | 5/2008 | Lechleider et al. |
| 7,370,116 B2 | 5/2008 | Chan et al. |
| 7,440,404 B2 | 10/2008 | Nagesh et al. |
| 7,450,914 B2 | 11/2008 | Valdivia et al. |
| 7,463,608 B2 | 12/2008 | Bolgiano et al. |
| 7,471,932 B2 | 12/2008 | Wu et al. |
| 7,486,643 B2 | 2/2009 | Czaja et al. |
| 7,515,566 B2 | 4/2009 | Dale et al. |
| 7,529,221 B2 | 5/2009 | Czaja et al. |
| 7,554,964 B2 | 6/2009 | Bolgiano et al. |
| 7,606,531 B2 | 10/2009 | Asai et al. |
| 7,620,010 B2 | 11/2009 | Takeda et al. |
| 7,657,455 B2 | 2/2010 | Sachdev et al. |
| 7,657,628 B1 | 2/2010 | McDysan et al. |
| 7,738,859 B2 | 6/2010 | Roy et al. |
| 7,746,784 B2 | 6/2010 | de Heer |
| 2001/0045494 A1 | 11/2001 | Higgins |
| 2002/0026523 A1 | 2/2002 | Mallory et al. |
| 2002/0077141 A1 | 6/2002 | Hwang et al. |
| 2002/0080816 A1 | 6/2002 | Spinar et al. |
| 2002/0110102 A1* | 8/2002 | Wei et al. ............... 370/335 |
| 2002/0126711 A1 | 9/2002 | Robinett et al. |
| 2002/0131376 A1 | 9/2002 | Wheatley et al. |
| 2002/0136276 A1 | 9/2002 | Franceschini |
| 2002/0186678 A1 | 12/2002 | Averbuch et al. |
| 2003/0016692 A1 | 1/2003 | Thomas et al. |
| 2003/0083095 A1 | 5/2003 | Liang |
| 2003/0128687 A1 | 7/2003 | Worfolk et al. |
| 2003/0147411 A1 | 8/2003 | Goosman |
| 2003/0207684 A1 | 11/2003 | Wesel |
| 2003/0223409 A1 | 12/2003 | Wiebe |
| 2004/0136334 A1 | 7/2004 | Heiman et al. |
| 2004/0142658 A1 | 7/2004 | McKenna et al. |
| 2004/0162099 A1 | 8/2004 | Chen et al. |
| 2004/0218577 A1 | 11/2004 | Nguyen et al. |
| 2004/0233867 A1 | 11/2004 | Wheatley |
| 2005/0009529 A1 | 1/2005 | Chen et al. |
| 2005/0021802 A1 | 1/2005 | Chen et al. |
| 2005/0025219 A1* | 2/2005 | Rice ............... 375/130 |
| 2005/0030931 A1 | 2/2005 | Sung et al. |
| 2005/0058135 A1 | 3/2005 | Sisto et al. |
| 2005/0122999 A1 | 6/2005 | Scherzer et al. |
| 2005/0233710 A1 | 10/2005 | Lakkis et al. |
| 2006/0013181 A1 | 1/2006 | Stolpman et al. |
| 2006/0050664 A1 | 3/2006 | Guey |
| 2006/0104301 A1 | 5/2006 | Beyer et al. |
| 2006/0110162 A1 | 5/2006 | Tian et al. |
| 2006/0153283 A1 | 7/2006 | Scharf et al. |
| 2007/0004415 A1 | 1/2007 | Abedi |
| 2007/0021117 A1 | 1/2007 | McKenna |
| 2007/0025398 A1 | 2/2007 | Yonge, III et al. |
| 2007/0030834 A1 | 2/2007 | Rappaport |
| 2007/0047499 A1 | 3/2007 | Montojo |
| 2007/0070908 A1 | 3/2007 | Ghosh et al. |
| 2007/0111760 A1* | 5/2007 | Hovers et al. ............... 455/562.1 |
| 2007/0189404 A1 | 8/2007 | Baum et al. |
| 2008/0075033 A1 | 3/2008 | Shattil |
| 2008/0076432 A1 | 3/2008 | Senarath et al. |
| 2008/0095121 A1 | 4/2008 | Shattil |
| 2008/0108361 A1 | 5/2008 | Ylanen et al. |
| 2008/0146177 A1 | 6/2008 | Hwang et al. |
| 2008/0186855 A1 | 8/2008 | Becker |
| 2008/0186856 A1 | 8/2008 | Becker |
| 2008/0186857 A1 | 8/2008 | Becker |
| 2008/0186859 A1 | 8/2008 | Becker |
| 2008/0186860 A1 | 8/2008 | Becker |
| 2008/0186861 A1 | 8/2008 | Becker |
| 2008/0186940 A1 | 8/2008 | Becker |
| 2008/0186994 A1 | 8/2008 | Becker |
| 2008/0186997 A1 | 8/2008 | Becker |
| 2008/0187002 A1 | 8/2008 | Becker |
| 2008/0187003 A1 | 8/2008 | Becker |
| 2008/0212524 A1 | 9/2008 | Niwano |
| 2008/0219211 A1 | 9/2008 | Franceschini |
| 2008/0219220 A1 | 9/2008 | Gerakoulis |
| 2008/0304506 A1 | 12/2008 | Becker |
| 2009/0080375 A1 | 3/2009 | Jalil et al. |
| 2009/0129334 A1 | 5/2009 | Ma et al. |
| 2009/0141680 A1 | 6/2009 | Becker |
| 2009/0141736 A1 | 6/2009 | Becker |
| 2011/0026472 A1 | 2/2011 | Reumerman et al. |

FOREIGN PATENT DOCUMENTS

| | | |
|---|---|---|
| EP | 0680168 A | 11/1995 |
| EP | 0917317 A | 5/1999 |
| EP | 1526655 A3 | 4/2005 |
| EP | 1909526 A | 4/2008 |
| JP | 2003-169164 A | 6/2003 |
| WO | WO 93/15573 A | 8/1993 |
| WO | WO 2004/054221 A1 | 6/2004 |
| WO | WO 2004/055249 A2 | 5/2007 |

OTHER PUBLICATIONS

Non-Final Office Action for U.S. Appl. No. 11/771,894; mailed on Jul. 23, 2009; 26 pages.

Non-Final Office Action for U.S. Appl. No. 11/771,798; mailed on Jul. 24, 2009; 22 pages.

Non-Final Office Action for U.S. Appl. No. 11/771,828 mailed on Jul. 24, 2009; 21 pages.

Non-Final Office Action for U.S. Appl. No. 11/771,903 mailed on Jul. 31, 2009; 24 pages.

"IEEE Standard for Local and Metropolitan Area Networks, Part 16: Air Interface for Fixed Broadband Wireless Access Systems-Amendment 2: Medium Access Control Modifications and Additional Physical Layer Specifications for 2-11 GHz," IEEE Std 802.16a™ Apr. 1, 2003, 318 pages, New York, New York.

"IEEE Standard for Local and Metropolitan Area Networks, Part 16: Air Interface for Fixed Broadband Wireless Access Systems," IEEE, May 29, 2009; 864 pages, New York, New York.

"IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands and Corrigendum 1," IEEE, Feb. 28, 2006, 864 pages, New York, New York.

Non-Final Office Action for U.S. Appl. No. 11/771,762 mailed on Oct. 16, 2009; 21 pages.

Non-Final Office Action for U.S. Appl. No. 11/771,840 mailed on Oct. 22, 2009; 22 pages.

Notice of Allowance for U.S. Appl. No. 11/771,856 mailed on Dec. 15, 2009; 4 pages.

Notice of Allowance for U.S. Appl. No. 11/771,870 mailed on Dec. 23, 2009; 4 pages.

Final Office Action for U.S. Appl. No. 11/771,882 mailed on Dec. 8, 2009; 30 pages.
Final Office Action for U.S. Appl. No. 11/771,894 mailed on Jan. 12, 2010; 36 pages.
Final Office Action for U.S. Appl. No. 11/771,903 mailed on Jan. 5, 2010; 33 pages.
Final Office Action for U.S. Appl. No. 11/771,910 mailed on Dec. 8, 2009; 19 pages.
Non-Final Office Action for U.S. Appl. No. 11/771,926 mailed on Nov. 27, 2009; 29 pages.
Final Office Action for U.S. Appl. No. 11/771,762 mailed on Feb. 5, 2010; 20 pages.
Final Office Action for U.S. Appl. No. 11/771,798 mailed on Jan. 25, 2010; 33 pages.
Final Office Action for U.S. Appl. No. 11/771,810 mailed on Jan. 27, 2010; 30 pages.
Final Office Action for U.S. Appl. No. 11/771,828 mailed on Jan. 22, 2010; 35 page.
Supplemental Notice of Allowability for U.S. Appl. No. 11/771,856 mailed on Feb. 12, 2010; 6 pages.
Supplemental Notice of Allowability for U.S. Appl. No. 11/771,856 mailed on Mar. 10, 2010; 2 pages.
Supplemental Notice of Allowability for U.S. Appl. No. 11/771,870 mailed on Feb. 12, 2010; 4 pages.
Supplemental Notice of Allowability for U.S. Appl. No. 11/771,870 mailed on Mar. 10, 2010; 2 pages.
Advisory Action for U.S. Appl. No. 11/771,882 mailed on Mar. 22, 2010; 5 pages.
Advisory Action for U.S. Appl. No. 11/771,903 mailed on Mar. 11, 2010; 3 pages.
Advisory Action for U.S. Appl. No. 11/771,910 mailed on Mar. 8, 2010; 5 pages.
International Preliminary Report on Patentability for PCT Application No. PCT/US2008/066360 mailed on Dec. 23, 2009; 8 pages.
International Preliminary Report on Patentability for PCT Application No. PCT/US2008/066361 mailed on Dec. 23, 2009; 7 pages.
Advisory Action for U.S. Appl. No. 11/771,798 mailed on Apr. 13, 2010; 3 pages.
Advisory Action for U.S. Appl. No. 11/771,810 mailed on Apr. 15, 2010; 3 pages.
Advisory Action for U.S. Appl. No. 11/771,828 mailed on Apr. 9, 2010; 3 pages.
Non-Final Office Action for U.S. Appl. No. 11/771,828 mailed on May 24, 2010; 24 pages.
Notice of Allowance for U.S. Appl. No. 11/771,840 mailed on Apr. 19, 2010 ; 16 pages.
Advisory Action for U.S. Appl. No. 11/771,894 mailed on Apr. 1, 2010; 3 pages.
Final Office Action for U.S. Appl. No. 11/771,926 mailed May 19, 2010; 18 pages.
"Distributed Bandwith Request and Allocation in Multi-Hop Relay" IEEE 802.16 Broadband Wireless Access Working Group; Jan. 8, 2007; 8 pages.
Asgarkhani et al; "Simulation Studies of Mixed Traffic on Satellite Channels Using TDMA-Reservation Protocol" Proceeding of the Annual International Phoenix Conference on Computers and Communications; Mar. 22, 1989; pp. 195-200; Washington, US.
Chan M.C. B. et al "A Dynamic Reservation Protocol for LEO Mobile Satellite Systems" IEEE Journal on Selected Areas in Communications, Apr. 1, 2004, pp. 559-573, vol. 22, No. 3.
Chitre et al; "Random Access with Notification—A New Multiple-Access Scheme for VSAT Networks" Comsat Technical Review, Mar. 21, 1989; pp. 99-12; vol. 19 No. 1; Communications Satellite Corporation; Washington US.
Ghosh et al; "Random Access Design for UMTS Air-Interface Evolution;" IEEE 65th Vehicular Technology Conference; pp. 1041-1045; Apr. 1, 2007.
Haberle H. et al, "G2-Combinations of Frequency, Time and Space Division Multiple Access in Multitransponder Satellite Communications"; pp. 432-440, Nov. 1, 1972.
Hideto et al, "A Wavelet Packet Modulation Method for Satellite Communications," Nov. 1, 2005 pp. 1-5.

"Orthonogal Pilot Channel Structure in E-UTRA Uplink;" TSG-RANAD HOC LTE; Jan. 25, 2006; pp. 1-8; Section 2-4.
"Random Access Burst Design for E-UTRA;" Panasonic, NTT DoCoMO; TSG-RAW WG1 Meeting #46; Aug. 28, 2006; pp. 1-9; Section 2-3; Tallinn, Estonia.
Tallal O; "Mac Architecture for Broadband satellite access system" Apr. 20, 2000 at URL http///users.encs.concordia.ca/{tahar/theses/Tallal-Thesis.pdf,.
PCT Written Opinion of the International Searching Authority for Application No. PCT/US/2008/053199; mailed Jul. 18, 2008; pp. 11.
PCT Search Report of the International Searching Authority for Application No. PCT/US/2008/053199 mailed on Jul. 18, 2008 pp. 4.
PCT Written Opinion of the International Searching Authority for Application No. PCT/US/2008/053200; mailed Jul. 18, 2008; pp. 10.
PCT Search Report of the International Searching Authority for Application No. PCT/US/2008/053200; mailed on Jul. 18, 2008 pp. 4.
PCT Search Report of the International Searching Authority for Application No. PCT/US/2008/053205; mailed on Jul. 18, 2008; pp. 4.
PCT Written Opinion of the International Searching Authority for Application No. PCT/US2008/053205; mailed Jul. 18, 2008; pp. 10.
PCT Search Report of the International Searching Authority for Application No. PCT/US/2008/053208; mailed on Jul. 18, 2008; pp. 4.
PCT Written Opinion of the International Searching Authority for Application No. PCT/US2008/053208; mailed Jul. 18, 2008; pp. 10.
PCT Written Opinion of the International Searching Authority for Application No. PC/US/2008/053210; mailed on Sep. 15, 2008; pp. 9.
PCT Search Report of the International Searching Authority for Application No. PCT/US/2008/053210; mailed on Sep. 15, 2008 pp. 6.
PCT Search Report of the International Searching Authority for Application No. PCT/US/2008/066360; mailed on Jun. 9, 2008; pp. 3.
PCT Written Opinion of the International Searching Authority for Application No. PCT/US/2008/066360; mailed on Jun. 9, 2008; pp. 8.
PCT Search Report of the International Searching Authority for Application No. PCT/US/2008/066361; mailed on Jun. 9, 2008; pp. 4.
PCT Written Opinion of the International Searching Authority for Application No. PCT/US/2008/066361; mailed on Jun. 9, 2008; pp. 7.
PCT Search Report of the International Searching Authority for Application No. PCT/US/2008/57672; mailed on Jun. 23, 2008; pp. 7.
PCT Written Opinion of the International Searching Authority for Application No. PCT/US/2008/57672; mailed on Jun. 23, 2008 pp. 3.
PCT Search Report of the International Searching Authority for Application No. PCT/US/2008/084574; mailed on Jan. 28, 2009; pp. 2.
PCT Written Opinion of the International Searching Authority for Application No. PCT/ US/2008/084574; mailed on Jan. 28, pp. 7.
PCT Search Report of the International Searching Authority for Application No. PCT/US/2008/084577; mailed on Feb. 5, 2009; pp. 2.
PCT Written Opinion of the International Searching Authority for Application No. PCT/US/2008/084577; mailed on Feb. 5, 2009; pp. 7.
Non-Final Office Action for U.S. Appl. No. 11/771,910; mailed on Jun. 18, 2009; pp. 17.
Non-Final Office Action for U.S. Appl. No. 11/771,882; mailed on Jun. 22, 2009; pp. 22.
Non-Final Office Action for U.S. Appl. No. 11/771,856; mailed on Jul. 8, 2009; pp. 7.
Non-Final Office Action for U.S. Appl. No. 11/771,870; mailed on Jul. 8, 2009; pp. 10.
Non-Final Office Action for U.S. Appl. No. 11/771,810; mailed on Jul. 21, 2009; pp. 18.
Final Office Action for U.S. Appl. No. 11/771,828 mailed on Sep. 8, 2010; 11 pages.

Notice of Allowance for U.S. Appl. No. 11/771,926 mailed on Aug. 9, 2010; 17 pages.
Non-Final Office Action for U.S. Appl. No. 12/134,868 mailed on Aug. 5, 2010; 23 pages.
Non-Final Office Action for U.S. Appl. No. 11/771,910 mailed on Dec. 1, 2010; 23 pages.
Supplemental Notice of Allowability for U.S. Appl. No. 11/771,926 mailed on Sep. 17, 2010; 15 pages.
Non-Final Office Action for U.S. Appl. No. 12/276,148 mailed on Oct. 5, 2010; 34 pages.
Advisory Action for U.S. Appl. No. 11/771,828 mailed on Nov. 22, 2010; 3 pages.
Final Office Action for U.S. Appl. No. 12/276,148 mailed on Mar. 17, 2011, 19 pages.
Notice of Allowability for U.S. Appl. No. 12/134,868 mailed on Feb. 3, 2011; 12 pages.

* cited by examiner

QUASISYNCHRONOUS RESERVATION REQUESTS

CROSS-REFERENCES TO RELATED APPLICATIONS

The present application claims benefit of priority under 35 U.S.C. 119(e) of U.S. provisional Application No. 60/943, 152, filed on Jun. 11, 2007, entitled "Quasisynchronous Reservation Requests," Client Reference No. VS-0266-US, the content of which is incorporated herein by reference in its entirety.

BACKGROUND OF THE INVENTION

In many applications, a communication medium is shared among a number of nodes. The nodes compete with one another for access to the shared communication medium. At any given moment, there may be more than one of the nodes that wish to transmit data over the shared communication medium. A system is typically put in place to facilitate access to the shared communication medium by the various nodes. Various categories of such multiple access systems have been developed.

One category of multiple access systems utilizes contention protocols. Examples of these contention protocols include the ALOHA protocol and the slotted ALOHA protocol, which are known in the art. Here, each node is allowed to freely transmit its data over the shared communication medium at any time or any slotted time. In a system employing a hub, each node sends its transmission to the hub, which then broadcasts the transmission to all nodes. In a system without a hub, each node directly broadcasts its transmission to all nodes. In either case, every node listens to the channel for its own transmission and attempts to receive it. If a node is unsuccessful in receiving its own transmission, the node can assume that its transmission was involved in a collision with another transmission, and the node simply re-transmits its data after waiting a random amount of time. In this manner, collisions are allowed to occur but are resolved by the nodes.

Another category of multiple access systems utilizes carrier sense protocols. Examples include persistent carrier sense multiple access (persistent CSMA) and non-persistent carrier sense multiple access (non-persistent CSMA) protocols, which are known in the art. Generally speaking, these protocols require each node to listen to the shared communication medium before transmitting. Only if the shared communication medium is available is the node allowed to transmit its data. In persistent CSMA, when a node senses that the shared communication medium is not available, the node continually listens to the shared communication medium and attempts to transmit as soon as the medium becomes available. In non-persistent CSMA, when a node senses that the shared communication medium is not available, the node waits an amount of time before attempting to listen to the shared communication channel for an opportunity to transmit. Even though a node listens first before transmitting, there still exists a probability for collisions. When the medium is available, two or more nodes can detect the availability and decide that they are going to transmit data. Various techniques have been developed to handle such collisions.

Yet another category of multiple access systems utilizes contention free protocols. Here, each node can reserve the shared communication medium in order to transmit data. The node can transmit data without colliding with transmissions from other nodes because the shared communication medium is reserved, for a particular time duration for example, for the node's transmission and not for any other transmission. A significant advantage of contention free protocols is that the communication medium is not taken up by unsuccessful transmissions that collide with one another and the resulting re-transmission attempts. This can lead to a more efficient use of the shared communication medium, especially as the number of nodes and number of data transmissions increase.

Some systems utilizing contention free protocols organize the communication medium into a request signal space and a transmission signal space. The request signal space may be organized into a plurality of request segments. A request segment generally refers to a portion of the request signal space that may be used for sending a request. Similarly, the transmission signal space may can be organized into a plurality of scheduled transmission segments. A scheduled transmission segment generally refers to a portion of the transmission signal space that may be used for sending a data transmission. A request to transmit data in the transmission signal space is made in the request signal space. A scheduled transmission segment is assigned to each request. A node transmits data on the transmission signal space after the request for transmission has been granted.

In such a system, request segments may be organized in the request signal space based on time-division multiplexing (TDM), frequency-division multiplexing (FDM), code-division multiplexing (CDM), and/or other multiplexing techniques. For example, when request segments are organized based on CDM, each request segment corresponds to a code channel that can be extracted from the request signal space by applying a particular code word. By utilizing CDM, the request segment is extended in time and spread in frequency. That is, without applying code-division multiple access, the request segment may be confined to a shorter time slot and narrower frequency bandwidth. Thus, the energy of a request can be spread out over a longer time slot and over a wider frequency bandwidth. This allows the transmitter to use less power. Specifically, the arrangement captures the otherwise unused power (power in unoccupied time slots and unoccupied frequency bandwidths) in a low load factor request channel. The use of CDM as applied to request segments can significantly improve request detection performance.

However, systems that organize requests segments based on code-division multiplexing often require precise time synchronization between nodes to ensure proper request detection performance. This can increase the complexity and cost of the system. Thus, to take full advantage of the benefits of a contention free protocol system utilizing CDM request segments, improved methods for reservation of the shared communication medium are needed.

BRIEF SUMMARY OF THE INVENTION

The present invention relates to methods and apparatuses for communicating using a shared communication medium. A request is sent in a request signal space where the request represents a code sequence that is a member of a set of code sequences. Each member is characterized by an autocorrelation function that has a peak centered at a zero time offset. Each member is further characterized by a cross correlation function defined with respect to each other member. The cross correlation function has a low correlation window having a width and surrounding a zero time offset. An assignment is received that assigns the request to a transmission opportunity in a scheduled transmission signal space. The assignment is made in response to detecting the code sequence from receiving multiple requests having relative timing offsets less than the width of the low correlation window. A data transmission is sent using the assigned transmission opportunity in the scheduled transmission signal space.

The set of code sequences may correspond to a generalized orthogonal code set, where the cross correlation function with respect to each other member of the set of code sequences is zero if the relative timing offsets are less than the width of the low correlation window.

The set of code sequences may correspond to a generalized quasi-orthogonal code set, where the cross correlation function with respect to each other member of the set of code sequences is small if the relative timing offsets are less than the width of the low correlation window.

The width of the low correlation window may be a function of the length of the code sequence and the number of members in the set of code sequences.

The length of the code sequence and the number of members in the set of code sequences may be selected so that the relative timing offsets of the multiple requests are less than the width of the low correlation window.

The present invention further relates to methods and apparatuses for communicating using a shared communication medium involving a plurality of nodes including a first node and a second node. At the second node, a request is received from the first node in a request signal space. The request represents a code sequence that is a member of a set of code sequences. Each member is characterized by an autocorrelation function having a peak centered at a zero time offset. Each member is further characterized by a cross correlation function defined with respect to each other member. The cross correlation function has a low correlation window having a width and surrounding a zero time offset. At the second node, an assignment is sent for assigning the request to a transmission opportunity in a scheduled transmission signal space. The assignment is made in response to detecting the code sequence from receiving multiple requests having relative timing offsets less than the width of the low correlation window. At the second node, a data transmission is received that uses the assigned transmission opportunity in the scheduled transmission signal space.

DETAILED DESCRIPTION OF THE INVENTION

The present invention relates to communications conducted over a shared communications medium involving a plurality of nodes. The invention is specifically related to techniques employed for requesting opportunities for scheduled transmissions.

Figure 1:
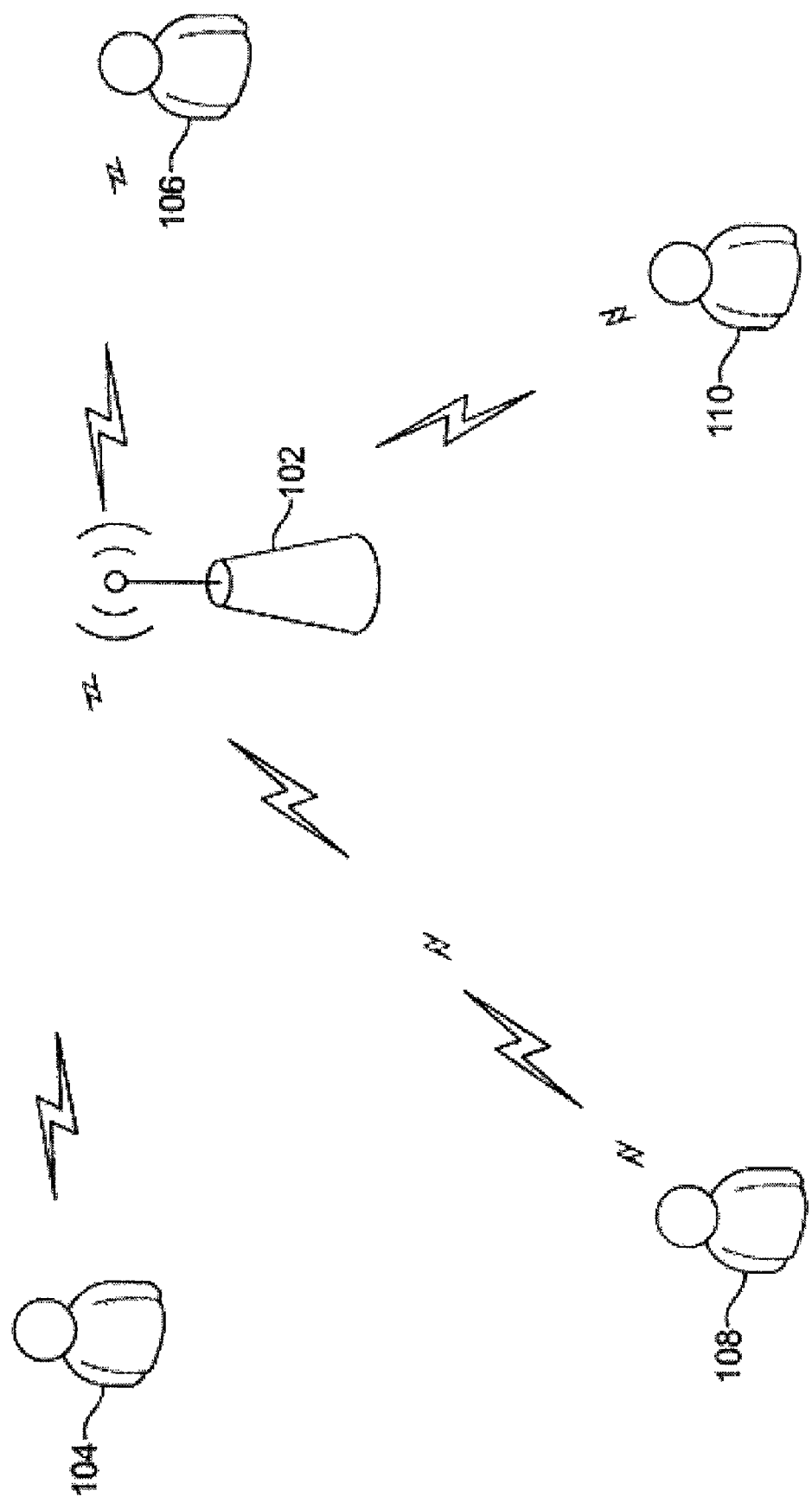
FIG. 1 presents a simplified network including a scheduler node 102 and a plurality of access nodes 104, 106, 108 and 110 utilizing a shared communication medium.

FIG. 1 presents a simplified network including a scheduler node 102 and a plurality of access nodes 104, 106, 108, and 110 utilizing a shared communication medium. This configuration corresponds to a mode of operation referred to here as "scheduler mode," which is described as an illustrative example.

Referring to FIG. 1, scheduler node 102 serves to control usage of the shared communication medium by access nodes 104, 106, 108, and 110. The shared communication medium can represent any communication medium that may be utilized by more than one node. For example, the shared communication medium can represent signal space in one or more satellite channels. Thus, the access nodes and the scheduler node may be part of a satellite network. As another example, the shared communication medium can represent signal space in one or more wireless terrestrial channels. Thus, the access nodes and the scheduler node may be part of a terrestrial wireless network. As yet another example, the shared communication medium can represent signal space in one or more wired channels. Thus, the access nodes and scheduler node may be part of a wired network.

Furthermore, embodiments of the present invention may be implemented in different network topologies that involve a shared communication medium. These may include star topologies, mesh topologies, bus topologies, and others.

Scheduler node 102 provides control over access to the shared communication medium by access nodes 104, 106, 108, and 110. In order to transmit data over the shared communication medium, an access node, such as access nodes 104, 106, 108, and 110, first sends a request to scheduler node 102. In response, scheduler node 102 assigns an opportunity for data transmission to the access node. Scheduler node 102 sends an assignment message associated with the assignment to the access nodes. Upon receiving the assignment, the access node that made the request can transmit data in the assigned transmission opportunity. This general scheme of request, assignment, and transmission is used in various embodiments of the invention. However, other embodiments of the invention may involve variations and different operations.

Figure 2:
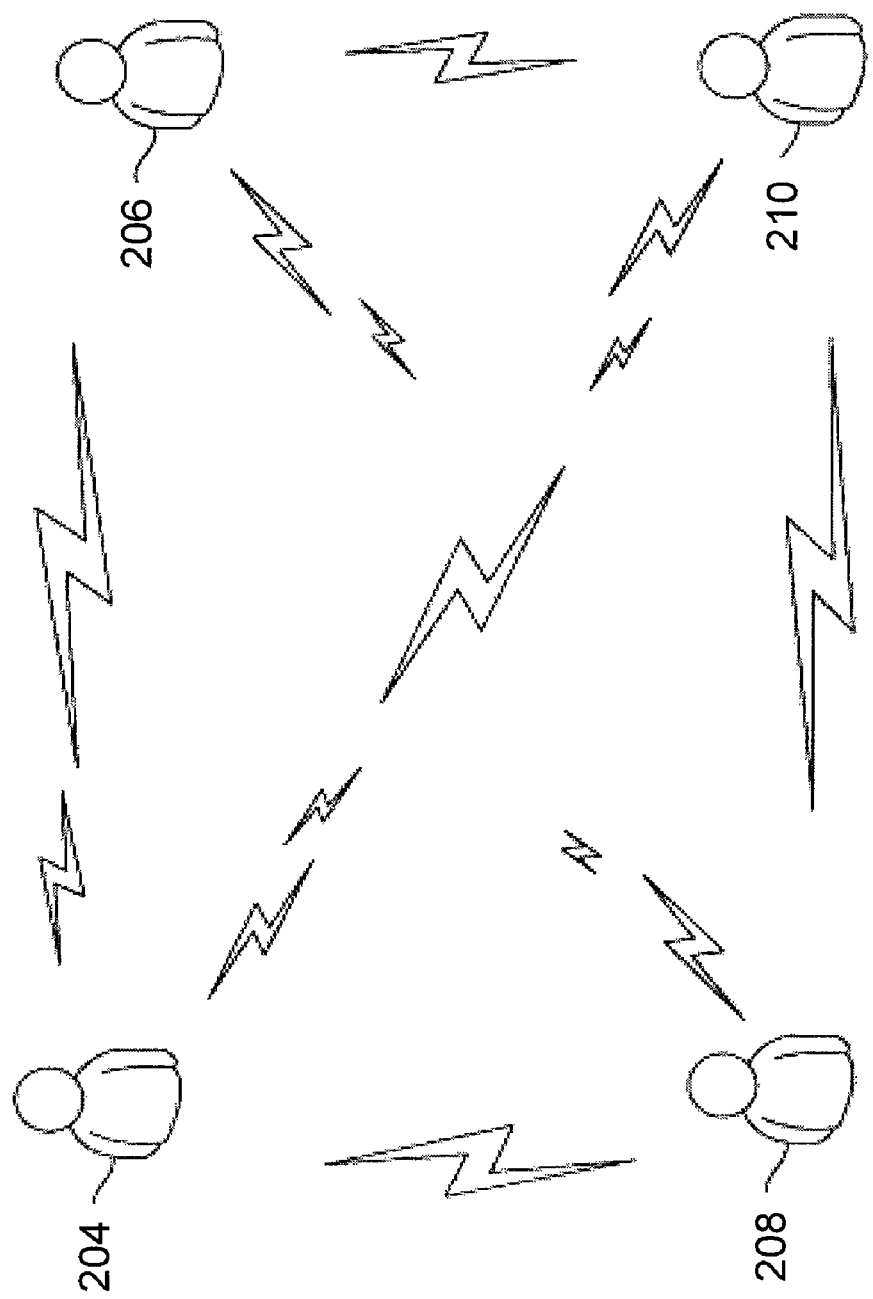
FIG. 2 presents a simplified network operating under a "no scheduler mode."

FIG. 2 presents a simplified network operating under a "no scheduler mode." A plurality of access nodes 204, 206, 208, and 210 are shown that utilize a shared communication medium. Instead of depending on a scheduler node to receive requests and determine the proper assignment of scheduled transmission segments, each access node 204, 206, 208, and 210 independently determines the proper assignment of scheduled transmission segments. Here, it is assumed that all access nodes follow the same rules for determining assignments, and all access nodes can detect all requests. If this is the case, then the same assignment of scheduled transmission segments would be generated at each access node. That is, each access node would independently generate the same assignment. As such, there would be no need for a dedicated scheduler node. Also, there would be no need for assignment messages to be sent. Each access node would be able to locally determine the proper assignment on its own. Consequently, a feedback signal space may not need to be provided for sending any assignment messages.

A "hybrid mode" is described below in accordance with another embodiment. Referring back to FIG. 1, under this mode, each access node, such as 104, 106, 108, and 110, receives both (1) assignment messages from a scheduler node such as 102 and (2) requests from the other access nodes. Here, each access node independently determines the proper assignment of scheduled transmission segments based on requests received from other nodes. However, in making the determination, the access node also takes into account the assignment messages received from the scheduler node. By utilizing both sources of information, each access node can make a more robust determination regarding the proper assignment of scheduled transmission segments.

According to yet another embodiment, a system may contain a mixture of access nodes operating under different assignment modes. Some of the access nodes in the system may operate under a "scheduler mode." Some of the access nodes in the system may operate under a "no scheduler mode," as discussed above. Finally, some of the access nodes in the system may operate under a "hybrid mode, as discussed above.

Symbols

Generally speaking, a basic unit of data transmission is referred to here as a "symbol." A symbol can be defined to have one out of a number of possible values. For example, a binary symbol may have one of two possible values, such as "0" and "1." Thus, a sequence of N binary symbols may convey $2^N$ possible messages. More generally speaking, an M-ary symbol may have M possible values. Thus, a sequence of N M-ary symbols may convey $M^N$ possible messages.

The concept of symbol and the methods by which a symbol can assume values is quite general. In many applications, a symbol is associated with a defined baseband pulse shape which is up-converted to a carrier frequency with a particular phase relationship to the carrier and with a particular amplitude. The amplitude and/or phase of the symbol is known as the modulation and carries the information of a symbol. The set of permissible modulation points defined in the amplitude and phase plane is known as the modulation constellation. The amount of information that a symbol may convey is related to the number of discrete points of the constellation. 16-QAM is an example of an amplitude-phase constellation which allows transmission of up to 4 bits of information per symbol. In some applications, only the phase is used for modulation. Quadra-phase shift keying (QPSK) is an example of pure phase modulation which allows transmission of up to 2 bits of information per symbol. In other applications, the symbol waveform may be defined such that symbol phase may either not exist or be difficult to receive accurately, in which case pure amplitude modulation can be used. One example of binary amplitude modulation is on-off amplitude-shift keying modulation which allows transmission of up to 1 bit of information per symbol.

Each symbol may occupy a particular portion of the relevant signal space. Specifically, each symbol may be said to occupy a certain amount of "time-bandwidth product." Here, an amount of time-bandwidth product is a scalar quantity that may be measured in units of Hz-seconds and does not necessarily dictate how the signal is distributed within the signal space. In theory, symbols cannot be strictly limited in both time and frequency. It is customary, however, to define the time-bandwidth product of a signal to be the time-bandwidth product of the region in which the preponderance of signal energy resides. Since precise definitions of time-bandwidth product vary somewhat throughout the literature, figures showing symbol boundaries in time-frequency space should only be considered as approximate representations.

Just as a simple example, a signal spanning a bandwidth of 1 Hz and lasting a duration of 1 second may have a time-bandwidth product of 1 Hz-second. A signal spanning a bandwidth of 0.5 Hz and lasting a duration of 2 seconds may also have a time-bandwidth product of 1 Hz-second. Similarly, a signal spanning a bandwidth of 0.1 Hz and lasting a duration of 10 seconds may also have a time-bandwidth product of 1 Hz-second. These examples do not assume any multiplexing of the signal space, which is discussed separately below. Also, the particular values used in these and other examples described herein are for illustrative purpose only. Different values may be used in actual systems.

The measurement of a symbol in terms of an amount of time-bandwidth product is also applicable when different signal space multiplexing techniques are employed. Such techniques may include time-division multiplexing, frequency-division multiplexing, wavelet-division multiplexing, code-division multiplexing, and/or others. In each of the following four examples, a symbol occupies a time-bandwidth product of 1 Hz-second, even though different signal space multiplexing techniques are used.

Figure 3:
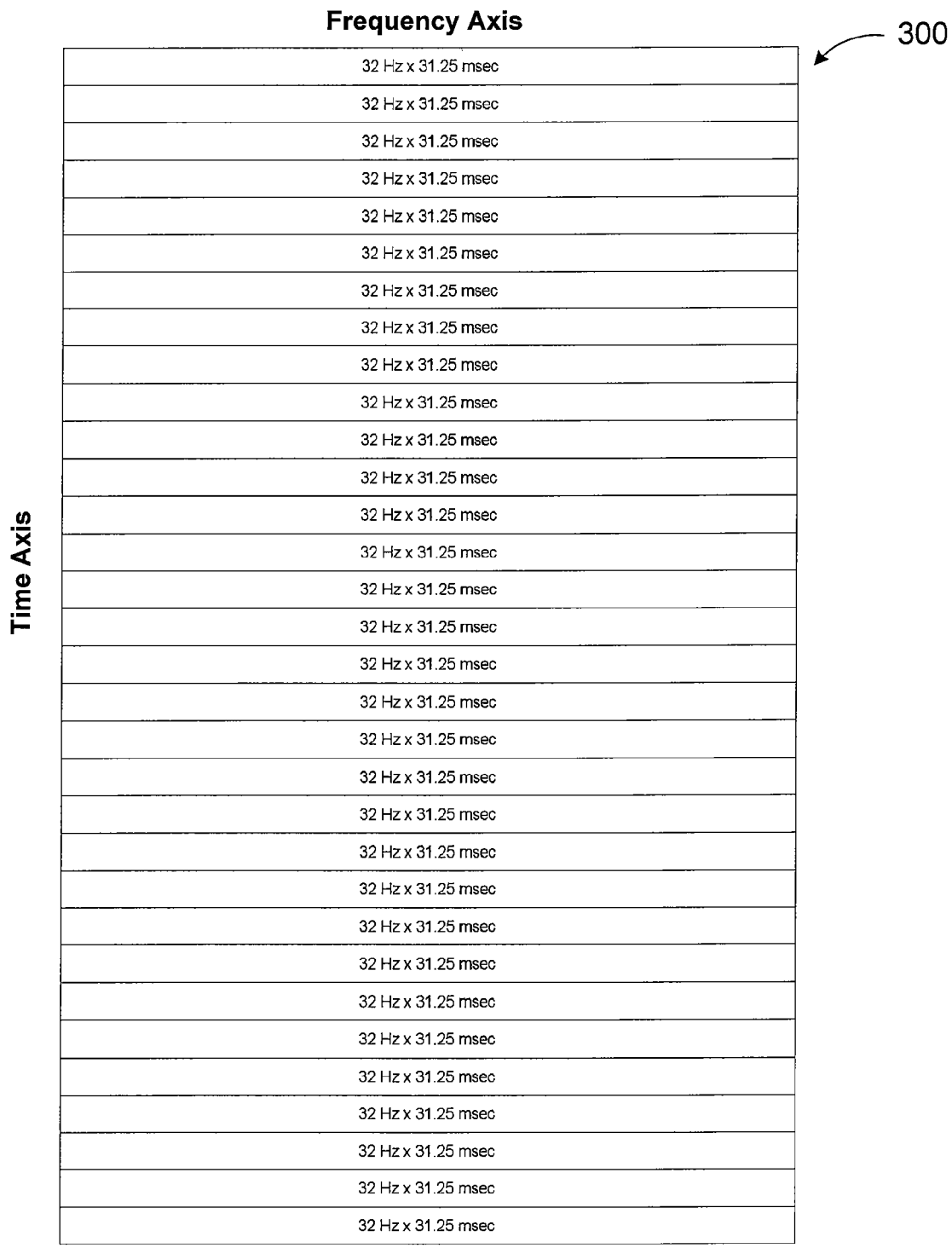
FIG. 3 depicts a time-division multiplexing scheme as applied to a frequency channel having a bandwidth of 32 Hz over a duration of 1 second.

In a first example, FIG. 3 depicts a time-division multiplexing scheme 300 as applied to a frequency channel having a bandwidth of 32 Hz over a duration of 1 second. The channel is divided into 32 time slots, each having a duration of 1/32 second. A symbol may be transmitted in each 1/32-second time slot over the bandwidth of 32 Hz. In this example, each symbol has a time-bandwidth product of 1 Hz-second.

Figure 4:
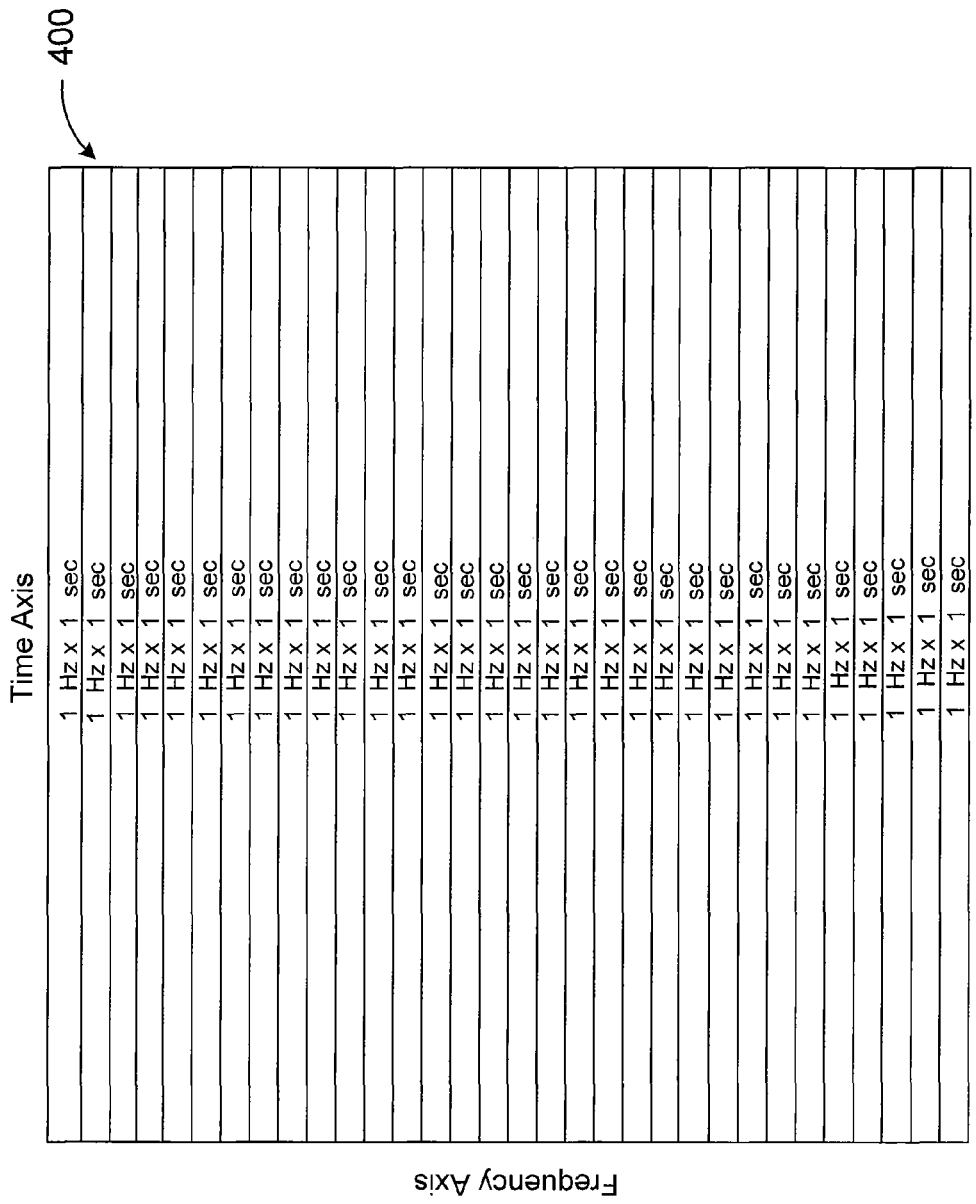
FIG. 4 depicts a frequency division multiplexing scheme as applied to a frequency channel having a bandwidth of 32 Hz over a duration of 1 second.

In a second example, FIG. 4 depicts a frequency division multiplexing scheme 400 as applied to a frequency channel having a bandwidth of 32 Hz over a duration of 1 second. The channel is divided into 32 different frequency sub-channels each having a bandwidth of 1 Hz. A symbol may be transmitted in each 1 Hz frequency sub-channel over the duration of 1 second. In this example, each symbol also has a time-bandwidth product of 1 Hz-second.

Figure 5:
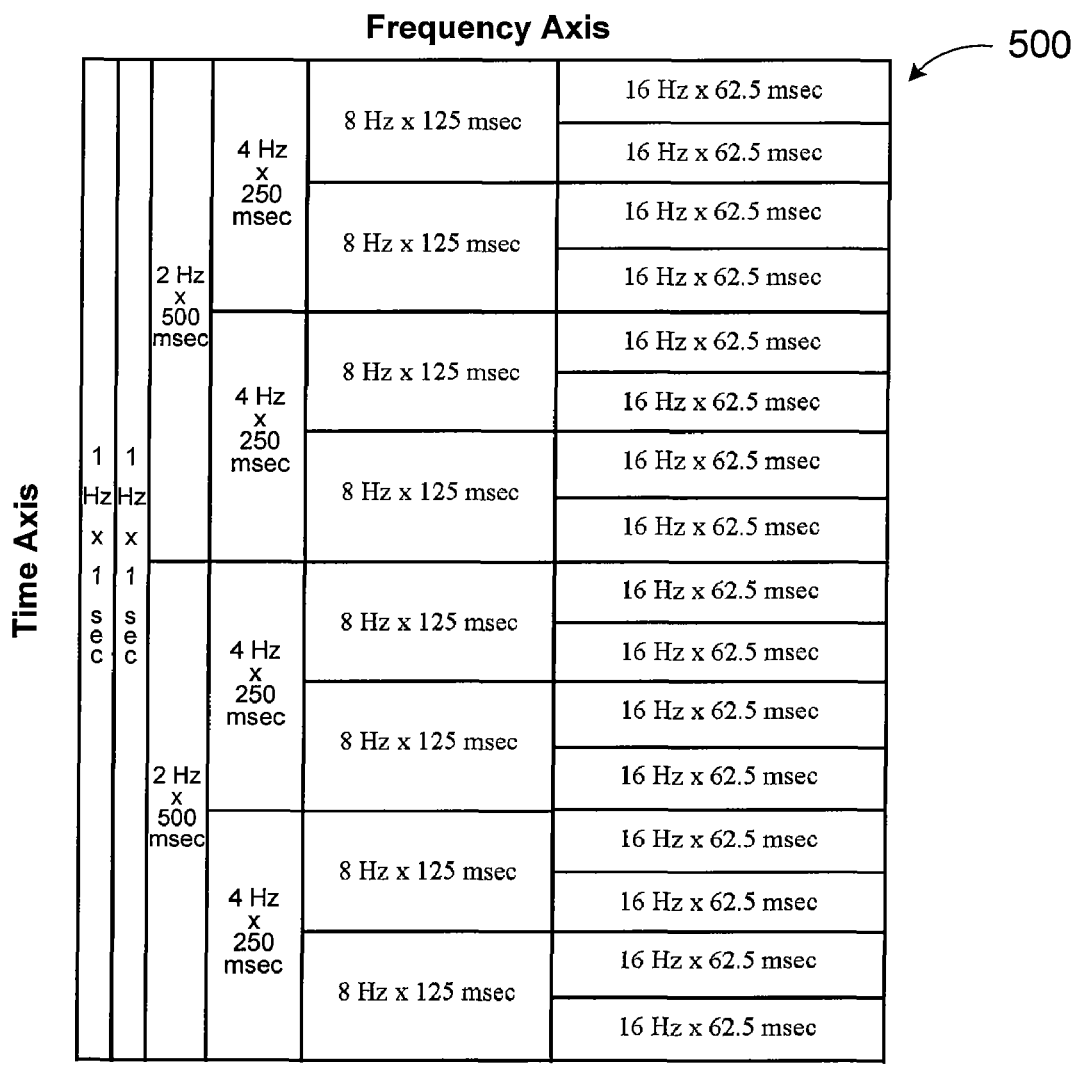
FIG. 5 depicts a wavelet-division multiplexing scheme as applied to a frequency channel having a bandwidth of 32 Hz over a duration of 1 second.

In a third example, FIG. 5 depicts a wavelet-division multiplexing scheme 500 as applied to a frequency channel having a bandwidth of 32 Hz over a duration of 1 second. The channel is divided into 32 different time and frequency symbol segments. 2 symbol segments have a bandwidth of 1 Hz with a duration of 1 second, 2 other symbol segments have a bandwidth of 2 Hz with a duration of ½ second, 4 other symbol segments have a bandwidth of 4 Hz with a duration of ¼ second, 8 other symbol segments have a bandwidth of 8 Hz with a duration of ⅛ second, and 16 additional symbol segments have a bandwidth of 16 Hz with a duration of 1/16 second. In this example, each symbol has a time-bandwidth product of 1 Hz-second, as well.

In a fourth example, a code-division multiplexing scheme is applied to a frequency channel having a bandwidth of 32 Hz over a duration of 1 second. For this example, it is assumed that there are 32 different possible orthogonal code words, each comprising a unique 32-chip binary pattern. Each code word represents a unique "code channel." To send a symbol on a particular code channel, the symbol value is used to modulate the code word associated with the code channel, and the resulting signal is sent. In the case of binary phase shift keying (BPSK) symbols, for instance, a symbol having a value of "1" may be sent by simply sending the code word, and a symbol having a value of "0" may be sent by sending the inverted version (180-degree phase shift) of the code word. The 32 symbols sent using 32 different "code channels" are non-interfering, and as a group, they occupy a common 32 Hz by 1 second portion of the time-frequency space. In this example, each symbol has an effective time-bandwidth product of 1 Hz-second.

Symbol-Level Request

Referring back to FIG. 1, a symbol-level request may be sent from an access node such as access nodes 104, 106, 108, and 110. Here, a symbol-level request refers to a request that can be sent in the form of a transmission signal having a time-bandwidth product comparable to that of a symbol.

The use of a symbol-level request allows for highly efficient utilization of the available signal space. Because of its compact size, a symbol-level request may not have sufficient capacity to carry a significant data payload. However information may be conveyed in the choice of the location within the request signal space in which the symbol-level request is transmitted. Thus, the existence of a symbol-level request in the request signal space, as well as the location where the symbol-level request exists in the request signal space, can convey important information that is used to facilitate the assignment of transmission opportunities within the shared communication medium.

Request Signal Space and Scheduled Transmission Signal Space

The shared communication medium utilized by access nodes 104, 106, 108, and 110 may be organized into a request signal space and a scheduled transmission signal space. Just as an example, the shared communication medium may be implemented as a satellite "return-link" that allows signals to be sent from access nodes 104, 106, 108, and 110 to scheduler node 102.

The request signal space may be used by access nodes 104, 106, 108, and 110 to send requests—e.g., symbol-level requests—to request opportunities for the scheduled transmission of data. Specifically, the request signal space may be organized into a plurality of request segments. Each request segment generally refers to a portion of request signal space that may be used for sending a request.

The scheduled transmission signal space may be used by access nodes 104, 106, 108, and 110 to transmit data traffic, once requests for transmission have been granted. The scheduled transmission signal space may be organized into a plurality of scheduled transmission segments. Each scheduled transmission segment generally refers to a portion of the scheduled transmission signal space that may be used for sending a data traffic transmission.

The request signal space, as well as the scheduled transmission signal space, may be organized based on various multiplexing techniques. As such, each request segment may have a different "location" within the request signal space. For example, if a request signal space is organized according to a code-division multiplexing technique, each request segment may comprise a particular code word and be said to correspond to a different location (in code space) in the request signal space. Similarly, the plurality of scheduled transmission segments in the scheduled transmission space may represent allotments defined based on one or more types of multiplexing techniques applied to the scheduled transmission signal space.

Also, the separation between the request signal space and the scheduled transmission signal space may be based on different multiplexing techniques. In one embodiment, code-division multiplexing is employed. For example, the request signal space and the scheduled transmission signal space may be defined over a common time duration and a common frequency range, but using different code words. Other embodiments of the invention may involve different combinations and/or variations.

Feedback Signal Space

A feedback signal space may be utilized for sending the assignment messages from scheduler node 102 to access nodes 104, 106, 108, and 110. In some embodiments of the invention, the feedback space is not a part of the shared communication medium. Continuing with a satellite system example, the feedback signal space may be implemented as a satellite "forward-link" that allows signals to be sent from scheduler node 102 to access nodes 104, 106, 108, and 110. This satellite "forward-link" may be separate from the "return-link" mentioned previously.

The present invention broadly covers different combinations of multiplexing techniques as applied to the request signal space and/or the scheduled transmission signal space. In figures discussed below, a number of examples of such multiplexing combinations are presented. The various combinations of multiplexing techniques described below are presented for illustrative purposes and are not intended to restrict the scope of the invention.

In the figures below, only a representative portion of the relevant signal space is shown. For example, if four frames of signals are shown, it should be understood that more frames may be used even though they are not explicitly illustrated. Also, the particular proportions of the various signal space designs are provided as mere examples.

Figure 6:
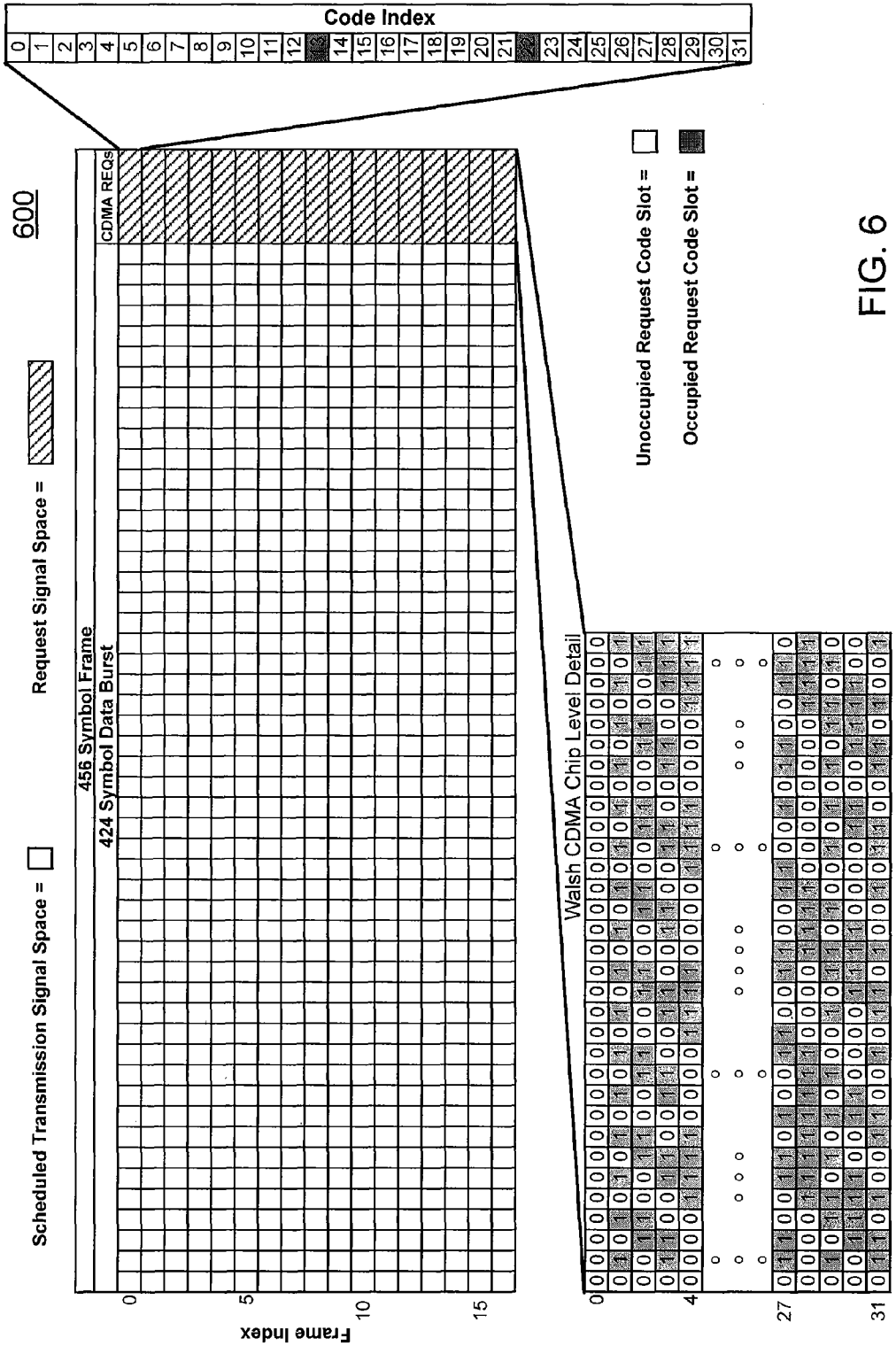
FIG. 6 is an illustrative signal diagram showing time division multiplexing as utilized to partition the request signal space and the scheduled transmission signal space, with CDM request segments.

TDM Request Signal Space and Scheduled Transmission Signal Space Partitioning with CDM Request Segments FIG. 6 is an illustrative signal diagram showing time division multiplexing (TDM) as utilized to partition the request signal space and the scheduled transmission signal space, with code division multiplexing (CDM) request segments. The figure shows a representation of a shared communication medium 600 based on a TDM structure that includes a request signal space and a scheduled transmission signal space. A feedback signal space is not explicitly shown in this figure but may also be implemented.

The structure shown in FIG. 6 is based on sequentially ordered frames. Seventeen such frames are shown in this figure, labeled by frame indices 0 through 16. Additional frames may follow. In this example, each frame has a total length of 456 symbols. This total length is divided between a scheduled transmission signal space portion having a length of 424 symbols and a request signal space portion having a length of 32 symbols.

For ease of illustration, the numerous symbols are not individually shown in this figure. Instead, boxes representing multiple symbols are shown. In the transmission signal space, each short box represents 8 scheduled transmission symbols. In the request signal space, each long box represents a 32-chip CDM request interval. Although the signal segments representing individual chips of any particular CDM code may be similar in design to the signal segments representing the scheduled transmission symbols, the chips of any particular code are linked in a particular code pattern (e.g., a 32-chip pattern), whereas the scheduled transmission symbols may be individually modulated. As shown, FIG. 6 presents scheduled transmission segments based on TDM and request segments based on CDM.

More specifically, in this example each 456-symbol frame supports 1 scheduled transmission segment and 32 request segments. The 1 scheduled transmission segment comprises the first 424 symbols of the frame. The 32 request segments comprise the 32 possible code words that may be transmitted in the remaining portion of the frame. In other words, the remaining portion of the frame is code division multiplexed and organized as a 32-chip request interval.

Here, a 32-chip Walsh CDMA code is shown. In this code space, there exist 32 different possible code sequences, or code words ("M"), each having a length of 32 chips ("L"). Indices 0 through 31 are used to identify the 32 different possible code words. FIG. 6 shows the chip-level detail of the 32 code words. As will be described, other types and lengths of code may be used in accordance with the invention.

One or more of the access nodes 104, 106, 108, and 110 can send one or more requests (each in the form of one of the 32 possible code words) in a particular request interval. This is illustrated in FIG. 6. In the example shown, two requests are sent in a request interval. The first request is a signal spread according to code word 13. The second request is a signal spread according to code word 22. Thus, in this example, code division multiplexing allows the request interval to support 32 request segments, i.e., codes slots. As shown in FIG. 6, two of these request segments are occupied. The remaining thirty request segments are unoccupied.

Scheduler node 102 detects reservation requests by correlation over the timeslot against all reservation request codes. In response, scheduler node 102 broadcasts assignment messages in feedback signal space (not shown). The assignment messages are broadcast to access nodes 104, 106, 108, and 110 to inform the access nodes of the assignments made, so that each access node may correctly send data in the assigned scheduled transmission segment(s).

The entire request and assignment process takes place in an anonymous manner with respect to the identity of the access nodes. Thus, a symbol-level request sent from an access node does not explicitly identify the access node. For example, assume that access node 104 sends the symbol-level request comprising code word 13. This symbol-level request is merely a signal transmitted at a particular code location within the request symbol space. The symbol-level request does not explicitly identify access node 104.

Similarly, the corresponding assignment message would not explicitly identify access node 104 as the intended recipient of the assignment message. Instead, the assignment message merely announces that the symbol-level request corresponding to code word 13 in Frame 0 has been assigned to a particular scheduled transmission segment. All of the access nodes 104, 106, 108, and 110 receive the broadcast assignment message. However, only access node 104 accepts the assignment and proceeds to send a data transmission in the scheduled transmission segment identified by the assignment. This is possible because each access node keeps track of the location(s) in code space of the symbol-level request(s) it has sent in each frame. Access node 104 recognizes the request identified in the assignment as one of its own and thus accepts the assignment. The other access nodes 106, 108, and 110 do not recognize the request identified in the assignment as one of their own and thus do not accept the assignment.

Figure 7:
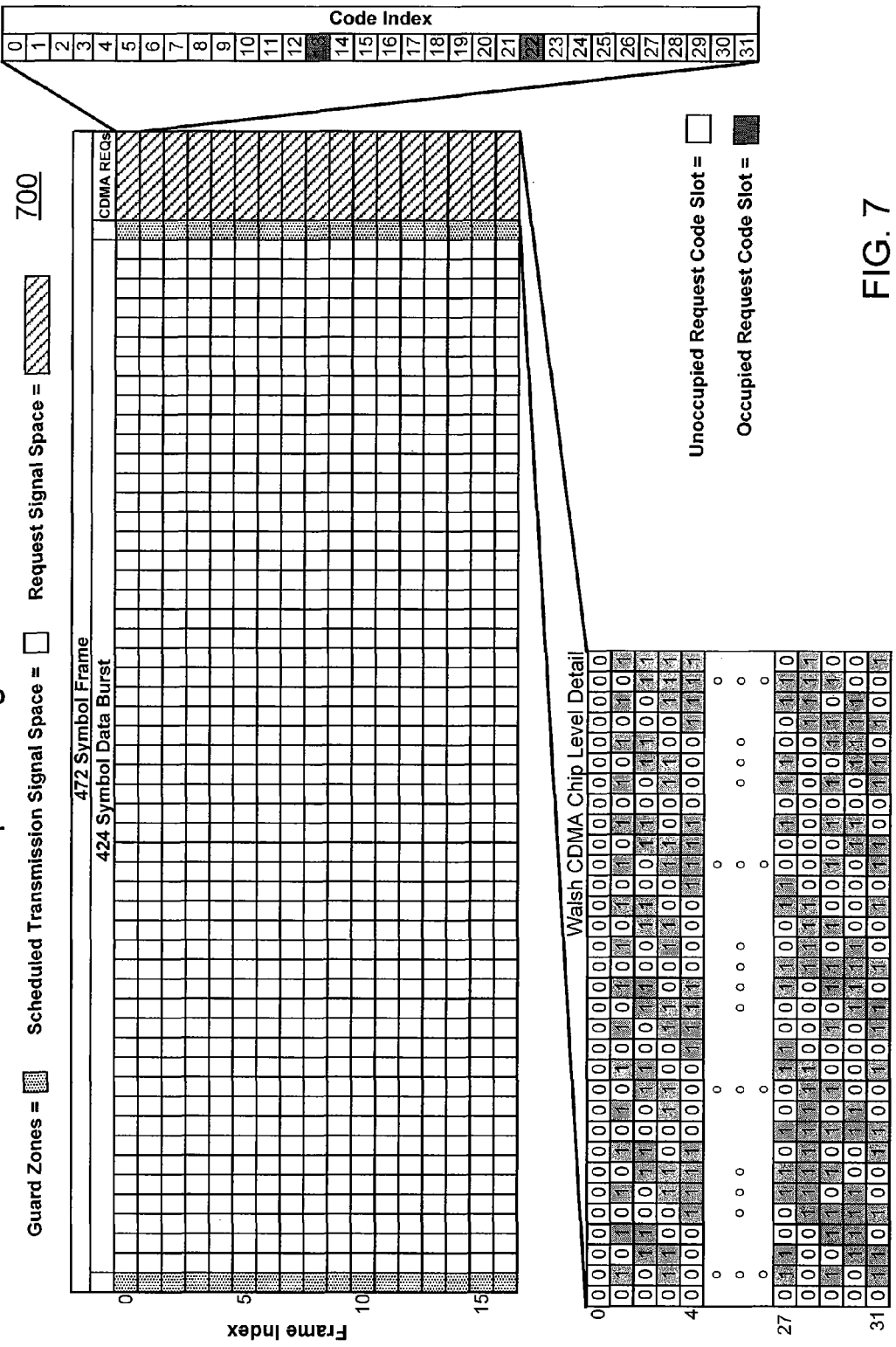
FIG. 7 is an illustrative signal diagram showing time division multiplexing as utilized to partition the request signal space and the scheduled transmission signal space, with code division multiplexing request segments, and guard zones to separate the request signal space and the scheduled transmission signal space.

TDM Request Signal Space and Scheduled Transmission Signal Space Partitioning with CDM Request Segments and Guard Zones to Separate the Request Signal Space and the Scheduled Transmission Signal Space FIG. 7 is an illustrative signal diagram showing TDM as utilized to partition the request signal space and the scheduled transmission signal space, with CDM request segments, and guard zones to separate the request signal space and the scheduled transmission signal space. The figure shows a representation of a shared communication medium 700 based on a TDM structure that includes a request signal space and a scheduled transmission signal space. A feedback signal space is not explicitly shown in this figure but may also be implemented in a manner similar to that described previously.

The structure shown in FIG. 7 is similar to that of FIG. 6, except that 8-symbol guard zones are inserted in each frame to separate the scheduled transmission signal space and the request signal space. The structure is again based on sequentially ordered frames. Seventeen such frames are shown in this figure, labeled by frame indices 0 through 16. Additional frames may follow. In this example, each frame has a total length of 472 symbols. This total length is divided among four different portions of the frame: (1) a guard zone having a length of 8 symbols, (2) a scheduled transmission signal space portion having a length of 424 symbols, (3) another guard zone having a length of 8 symbols, and (4) a request signal space portion having a length of 32 code chips.

For ease of illustration, the numerous symbols are not individually shown in this figure. Instead, boxes representing multiple symbols are shown. In the request signal space, each long box represents a 32-chip CDM request interval. For the guard zones, each short box represents 8 guard symbols. Thus, FIG. 7 presents scheduled transmission segments based on TDM and request segments based on CDM.

Again, a 32-chip Walsh CDMA code is shown as an example. In this code space, there exist M=32 different possible code words, each having a length of L=32 chips. Indices 0 through 31 are used to identify the 32 different possible code words. FIG. 7 shows the chip-level detail of the 32 code words. Other types and lengths of code may be used in accordance with the invention.

One or more of the access nodes 104, 106, 108, and 110 can send one or more requests (each in the form of one of the 32 possible code words) in a particular request interval. In the example shown, two requests are sent in a request interval. The first request is a signal spread according to code word 13. The second request is a signal spread according to code word 22. Thus, in this example code division multiplexing allows the request interval to support 32 request segments, i.e., codes slots. As shown in FIG. 7, two of these request segments are occupied. The remaining thirty request segments are unoccupied.

Scheduler node 102 detects reservation requests by correlation over the timeslot against all reservation request codes. In response, scheduler node 102 broadcasts assignment messages in feedback signal space (not shown). The assignment messages are broadcast to access nodes 104, 106, 108, and 110 to inform the access nodes of the assignments made, so that each access node may correctly send data in the assigned scheduled transmission segment(s).

In FIG. 7, it is assumed that a TDM system is implemented in which the nodes are not sufficiently time-synchronized, such that guard zones are needed to separate the scheduled transmission symbols and the request intervals. Because of the imperfect time synchronization, different requests received may be time-offset from one another. As a result, energy from immediately adjacent scheduled transmission symbols may interfere with and degrade the proper reception and processing of the requests. By inserting guard zones, the likelihood of such encroachment is reduced, thereby allowing better performance when nodes are not sufficiently synchronized in time.

Quasisynchronous Codes

Using guard zones, as shown in FIG. 7, provides separation in time between the scheduled transmission signal space and the request signal space when nodes are not sufficiently synchronized in time. However, guard zones do not provide separation between code words within a CDM code space. For example, if CDM requests are not precisely synchronized in time relative to a receiving node, off-time correlation peaks between codes can lead to either false detections or missed transmissions.

The time synchronization requirements necessary to provide sufficient separation within a code space can be more strict than the requirements necessary to prevent overlap between adjoining transmissions. For example, 8 symbol guard zones, as described above, may provide adequate separation in time between scheduled transmission symbols and request intervals. However, CDM requests may require synchronization to within a small fraction of a symbol, or reservation request chip, to preserve separation between codes. According to embodiments of the invention, these strict time synchronization requirements can be relaxed by selecting a CDM code set that is designed to provide improved request detection performance when time synchronization is not precise. Such code sets are generally referred to as "quasisynchronous" codes. Various approaches have been developed for the design of quasisynchronous codes, in accordance with the present invention.

For example, one approach for the design of quasisynchronous codes utilizes Gold codes. Gold codes are designed to have low cross correlation between codes across all time errors. Another approach utilizes generalized orthogonal codes. These codes are constructed to have zero cross correlation between codes over a range of time errors. The range of time errors across which the codes have zero cross correlation is generally referred to as the zero correlation window. A third approach for the design of quasisynchronous codes utilizes generalized quasi-orthogonal codes. These codes are constructed to have small cross correlation between codes over a range of time errors. The magnitude of the small correlation over the range of time errors is defined by the particular code set. Each of these approaches improves detection performance when time synchronization is not precise. Other codes that provide improved detection performance may be used in accordance with the invention.

The present invention broadly covers different quasisynchronous codes as applied to the request signal space and/or the scheduled transmission signal space. In the figures discussed below, a number of examples of such quasisynchronous codes are presented. The various quasisynchronous codes described below are presented for illustrative purposes and are not intended to restrict the scope of the invention.

Synchronous Walsh Codes as a Comparison for Quasisynchronous Codes

Walsh codes are an orthogonal code commonly used when time synchronization is exact. As such, Walsh codes are synchronous rather than quasisynchronous codes. However, Walsh code performance is examined here to provide a reference against which the performance of quasisynchronous codes can be compared.

The construction of Walsh codes is known in the art. In general, Walsh codes are calculated using the Walsh function, and can be constructed iteratively for a set that contains $M=2^k$ codes using to the following formula.

$$A_1 = 1$$
$$A_{k+1} = \begin{bmatrix} A_k & -A_k \\ A_k & A_k \end{bmatrix}$$

FIGS. 6 and 7 depict a 32-chip Walsh CDMA code set. In this code space, there exists M=32 different possible code 2e2words, each having a length of L=32 chips. Indices 0 through 31 are used to identify the 32 different possible code words.

Figure 8:
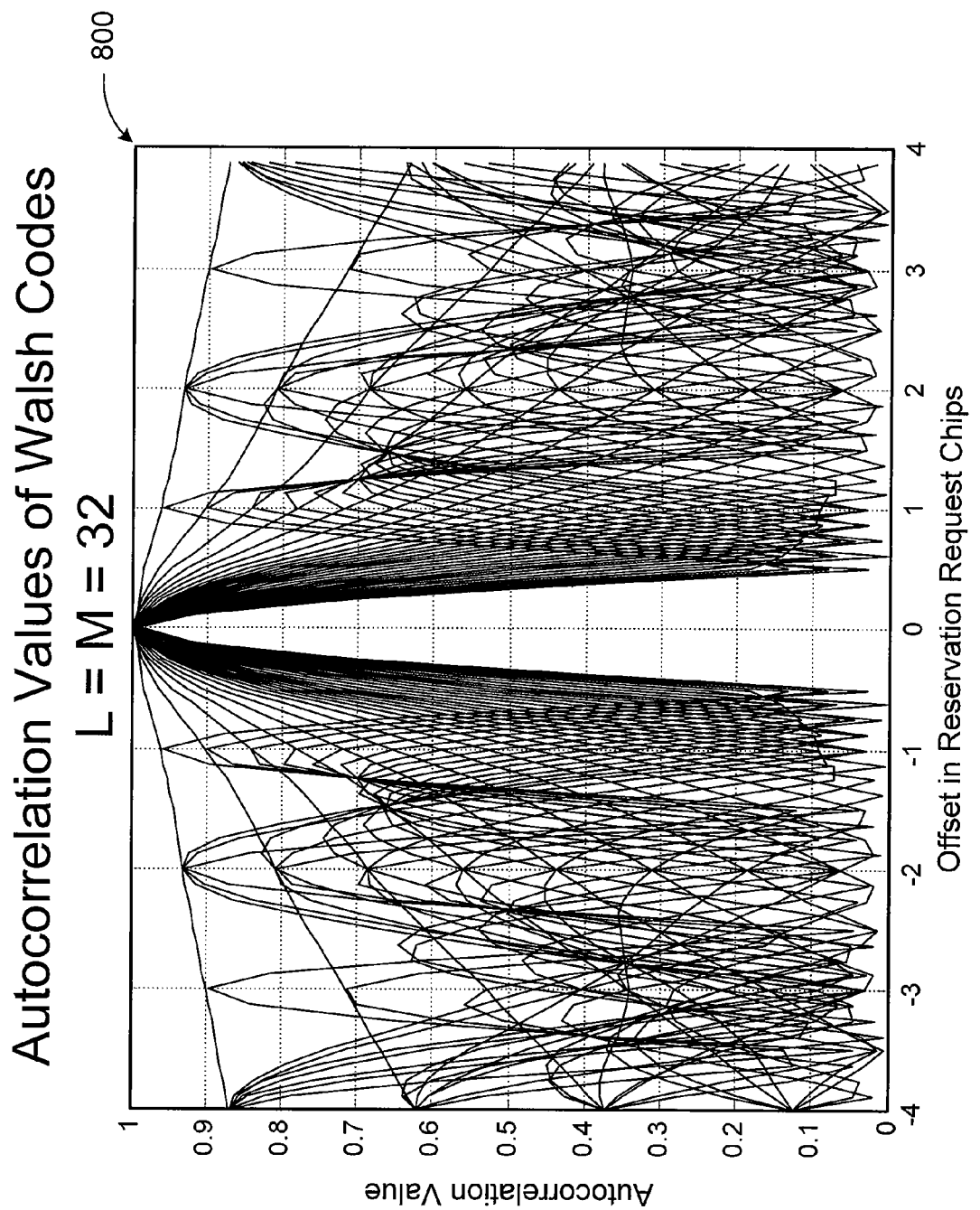
FIG. 8 is a plot of the autocorrelation values for each of the 32 code words in a 32-chip Walsh CDMA code set.
Figure 9:
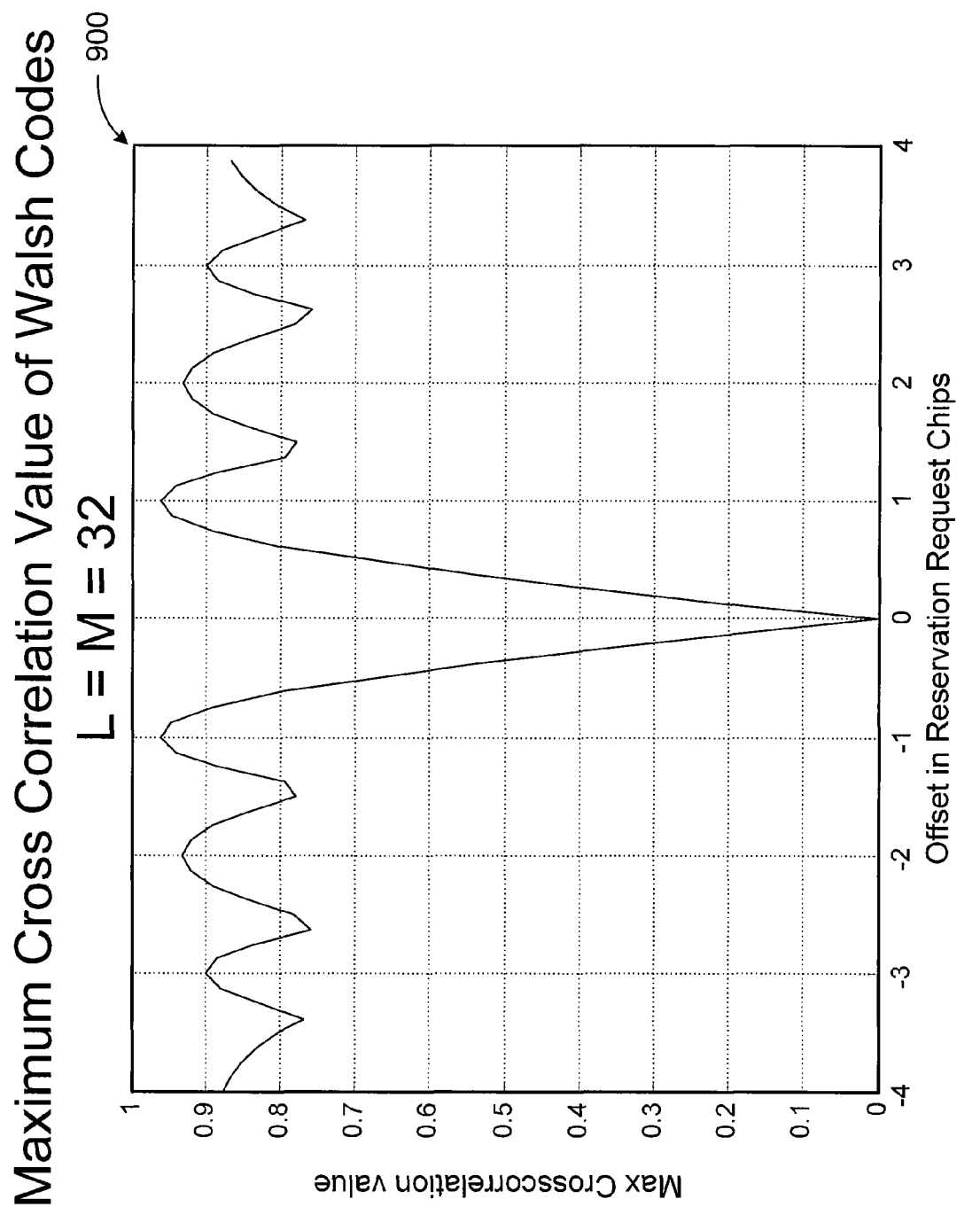
FIG. 9 is a plot of the maximum cross correlation value between each of the 32 code words in a 32-chip Walsh CDMA code set.

FIG. 8 is a plot 800 of the autocorrelation values for each of the 32 code words in a 32-chip Walsh CDMA code set across a range of offsets measured in reservation request chips. A reservation request chip and a symbol are nominally the same. FIG. 9 is a plot 900 of the maximum cross correlation value between each of the 32 code words in a 32-chip Walsh CDMA code set. FIG. 9 shows that all on-time cross correlation values are zero. However, FIG. 9 also shows a rapid rise in off-time maximum cross correlation values even a small fraction of a reservation chip from zero, or on-time.

Figure 10:
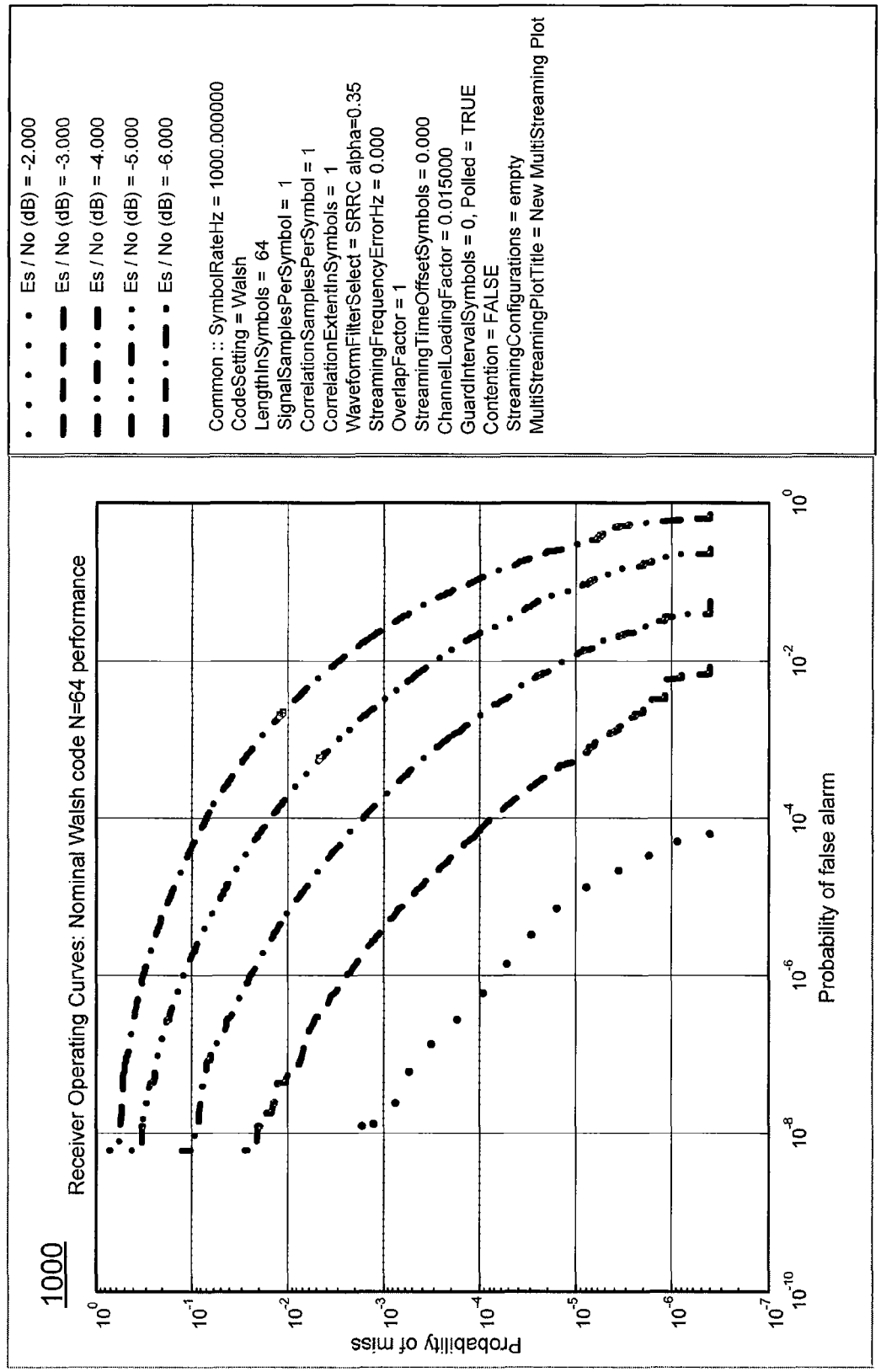
FIG. 10 is a plot of expected envelope detector performance under different noise levels for a 64-chip Walsh CDMA code set of 64 different code words with on-time performance.

FIG. 10 is a plot 1000 of the expected envelope detector performance under different noise levels for a 64-chip Walsh CDMA code set of 64 different code words with on-time, or perfect time synchronization performance. According to various embodiments of the invention, an envelope detector may be implemented to detect requests sent in the request signal space. Designs of such envelope detectors are well-known in the art. FIG. 10 shows a number of performance curves, known in the art as receiver operating characteristic (ROC) curves. Each curve represents the expected performance of the 64-chip Walsh CDMA code set with on-time performance for a particular noise level, which is expressed in terms of a ratio of energy per symbol, or chip, over noise (Es/No). Each curve demonstrates the trade off that can be expected at a particular noise level between (1) probability of missed detection and (2) probability of false alarm for the detector. Adjusting the detection threshold of the detector moves the performance of the detector along the curve. Any point on the curve represents a particular tradeoff between probability of missed detection and probability of false alarm.

As shown in FIG. 10, the overall performance of the envelope detector degrades as the noise levels increase. Further, as the probability of a missed detection decreases (shown on the vertical axis), the probability of a false alarm increases (shown on the horizontal axis).

Figure 11:
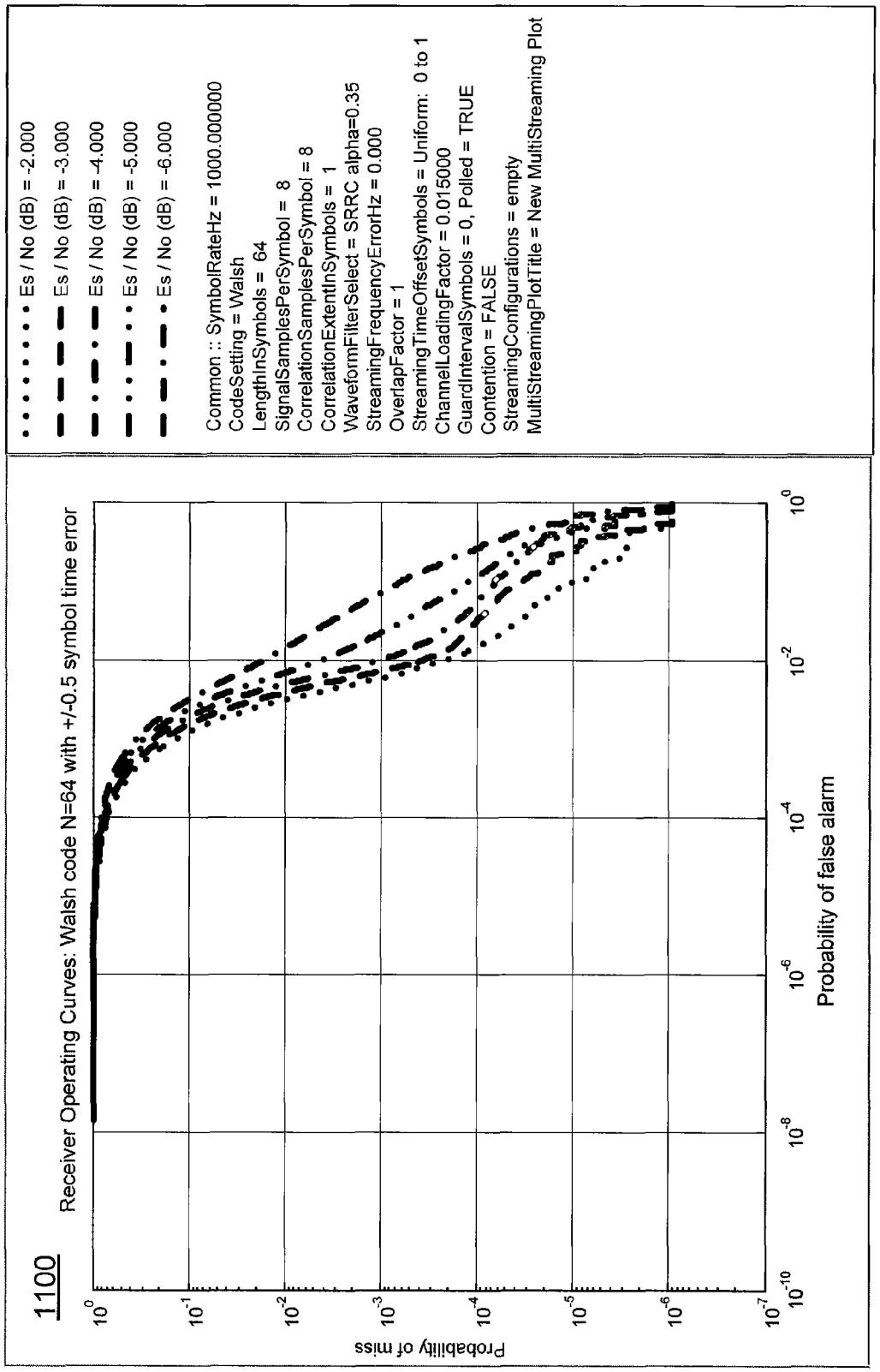
FIG. 11 is a plot of expected envelope detector performance under different noise levels for a 64-chip Walsh CDMA code set of 64 different code words with a time error of +/−0.5 chips.

FIG. 11 is a plot 1100 of expected envelope detector performance under different noise levels for a 64-chip Walsh CDMA code set of 64 different code words with a time error, or time offset, or +/−0.5 chips. As FIG. 11 shows, the performance of the system degrades with a time offset of +/−0.5 chips. Both the probability of a miss and the probability of a false alarm increase over the on-time performance curves shown in FIG. 10. As FIGS. 10 and 11 illustrate, Walsh code performance degrades considerably with small offsets between codes. Thus, Walsh codes would not provide relaxation of the time synchronization requirements in a system utilizing CDM reservation requests if the relative time error exceeded a small fraction of a reservation request chip. FIGS. 8, 9, 10, and 11 illustrate the performance of Walsh codes and provide a reference against which the performance of quasi-synchronous codes, described below, are compared.

Quasisynchronous Gold Codes

Figure 12:
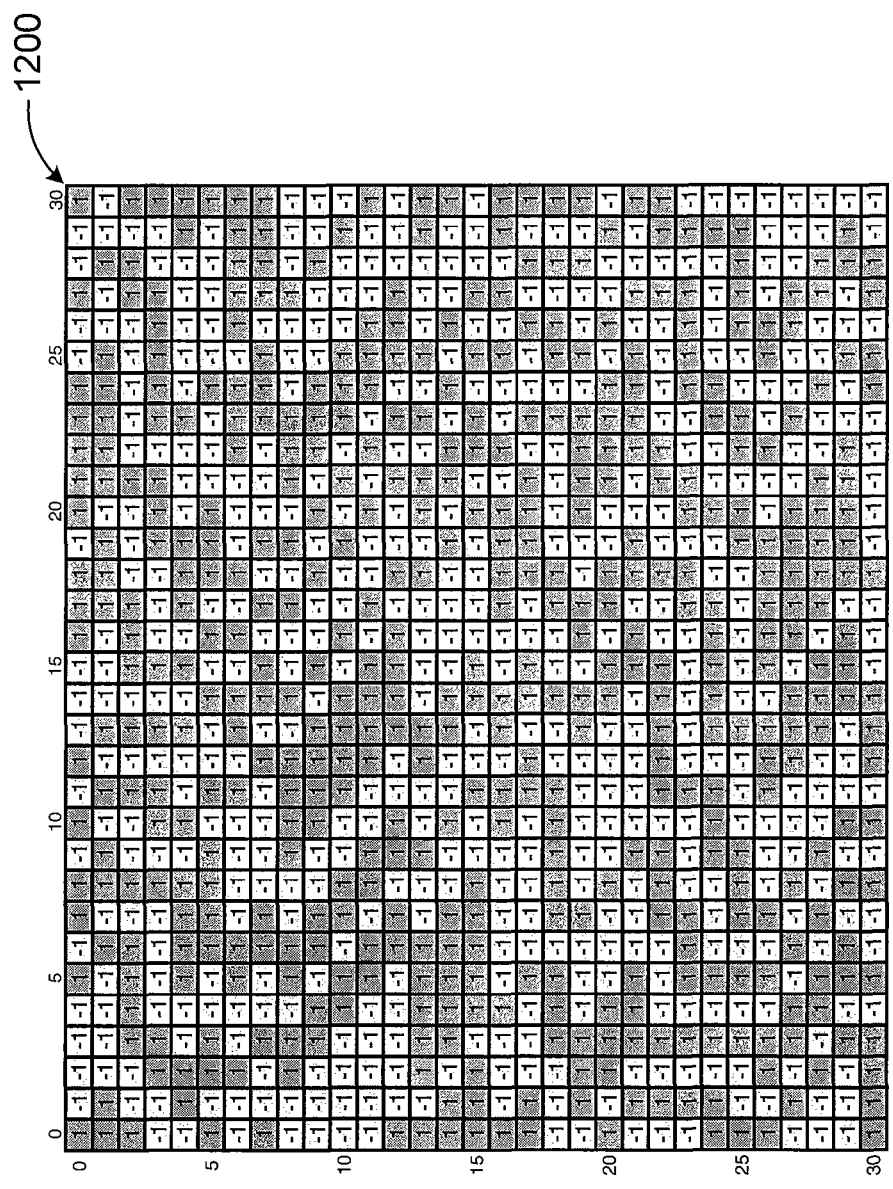
FIG. 12 depicts a 31-chip Gold CDMA code subset with 31 different possible code words.

Gold codes are a quasi-orthogonal code with significantly better off-time performance than Walsh codes. As mentioned previously, Gold codes are constructed to have low cross correlation between codes across all time offsets. A specific subset of Gold codes has $M=(2^N-1)$ code words each $L=(2^N-1)$ chips long. As an example, FIG. 12 depicts a 31-chip Gold CDMA code subset 1200 with 31 different possible code words (N=5). Indices 0 through 30 are used to identify the 31 different possible code words.

The construction of Gold codes is known in the art. In general, Gold codes are constructed as the exclusive or (or XOR) of two different m-sequences of the same length, where one code is stationary and the other code shifts by one chip to create the next code. (Traditionally, the two m-sequences themselves are added to the set, yielding a total of $(2^N+1)$ code words. These additional code words are not used in the examples contained herein, hence the references to Gold CDMA code "subset".)

Figure 13:
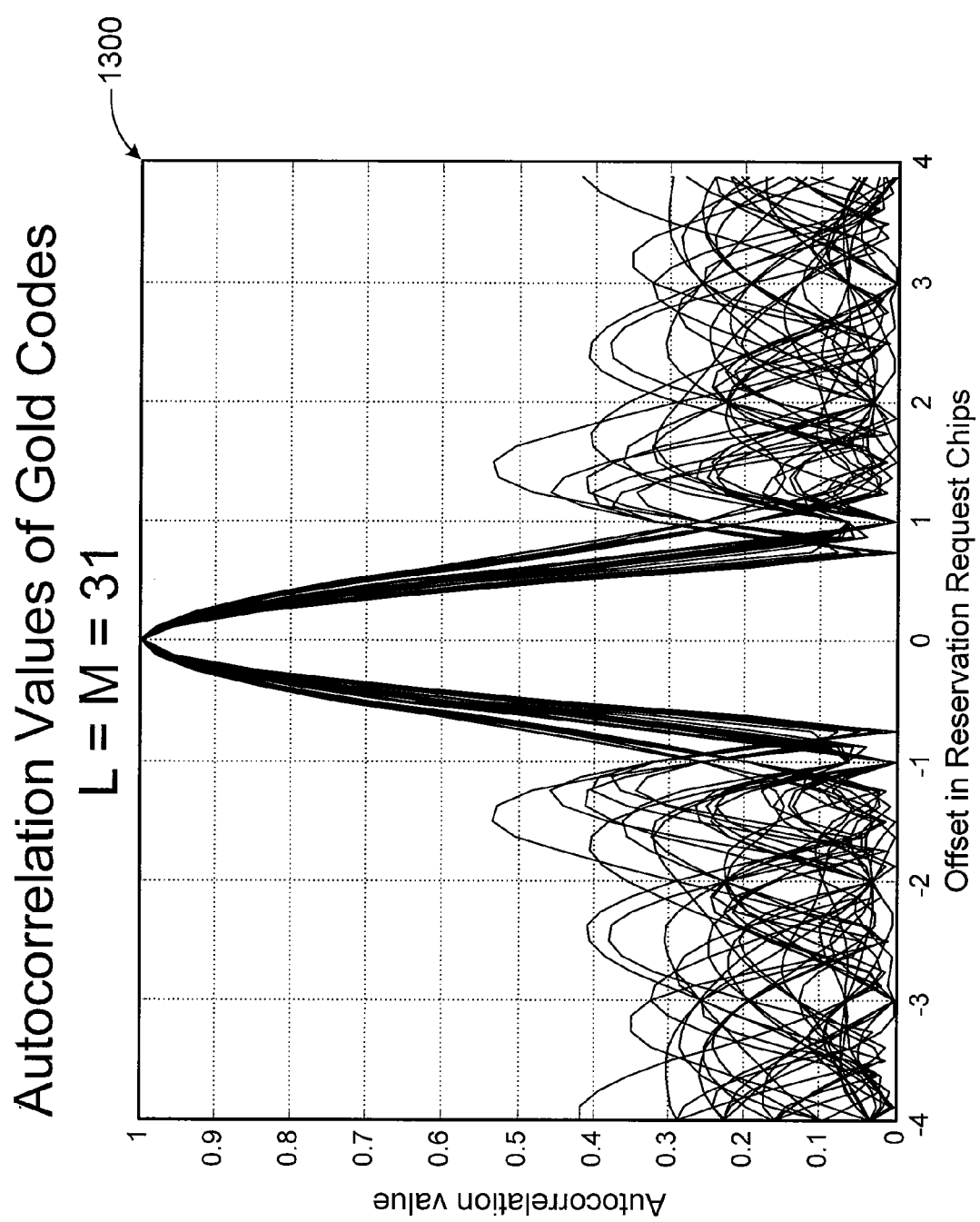
FIG. 13 is a plot of the autocorrelation values for each of the 31 code words in a 31-chip Gold CDMA code subset, according to an embodiment of the invention.

FIG. 13 is a plot 1300 of the autocorrelation values for each of the 31 code words in a 31-chip Gold CDMA code subset across a range of offsets measured in reservation request chips, according to an embodiment of the invention. FIG. 13 shows that all on-time autocorrelation values are 1, and all off-time autocorrelations are, in general, less than the off-time autocorrelation values of the Walsh codes shown in FIG. 8.

Figure 14:
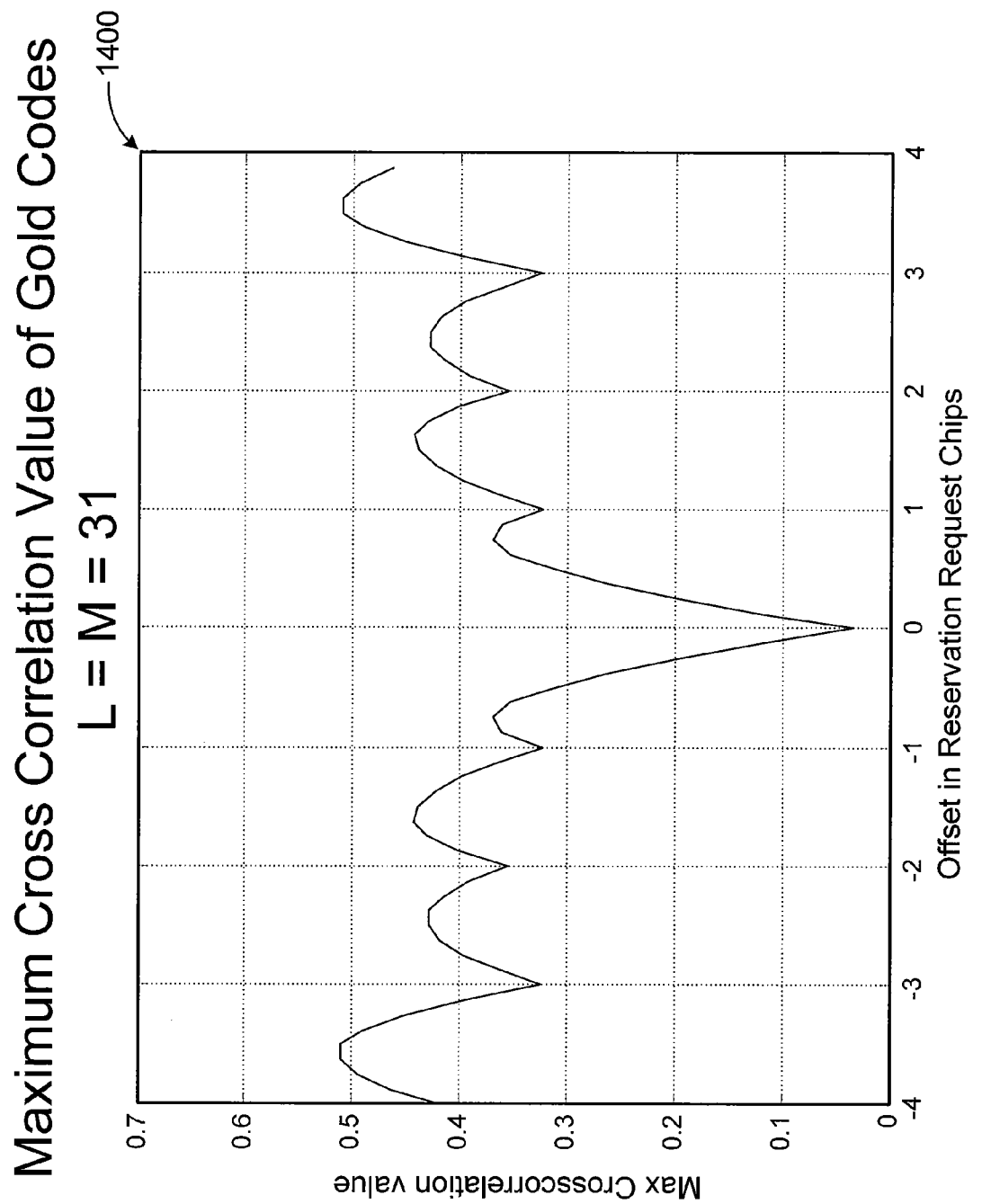
FIG. 14 is a plot of the maximum cross correlation value between each of the 31 code words in a 31-chip Gold CDMA code subset, according to an embodiment of the invention.

FIG. 14 is a plot 1400 of the maximum cross correlation value between each of the 31 code words in a 31-chip Gold CDMA code subset, according to an embodiment of the invention. FIG. 14 shows that all on-time cross correlation values are near zero. However, like Walsh codes, off-time maximum cross correlation values increase rapidly even a small fraction of a reservation chip from on-time. Further, off-time maximum cross correlation values are similar in magnitude to off-time autocorrelation values.

Figure 15:
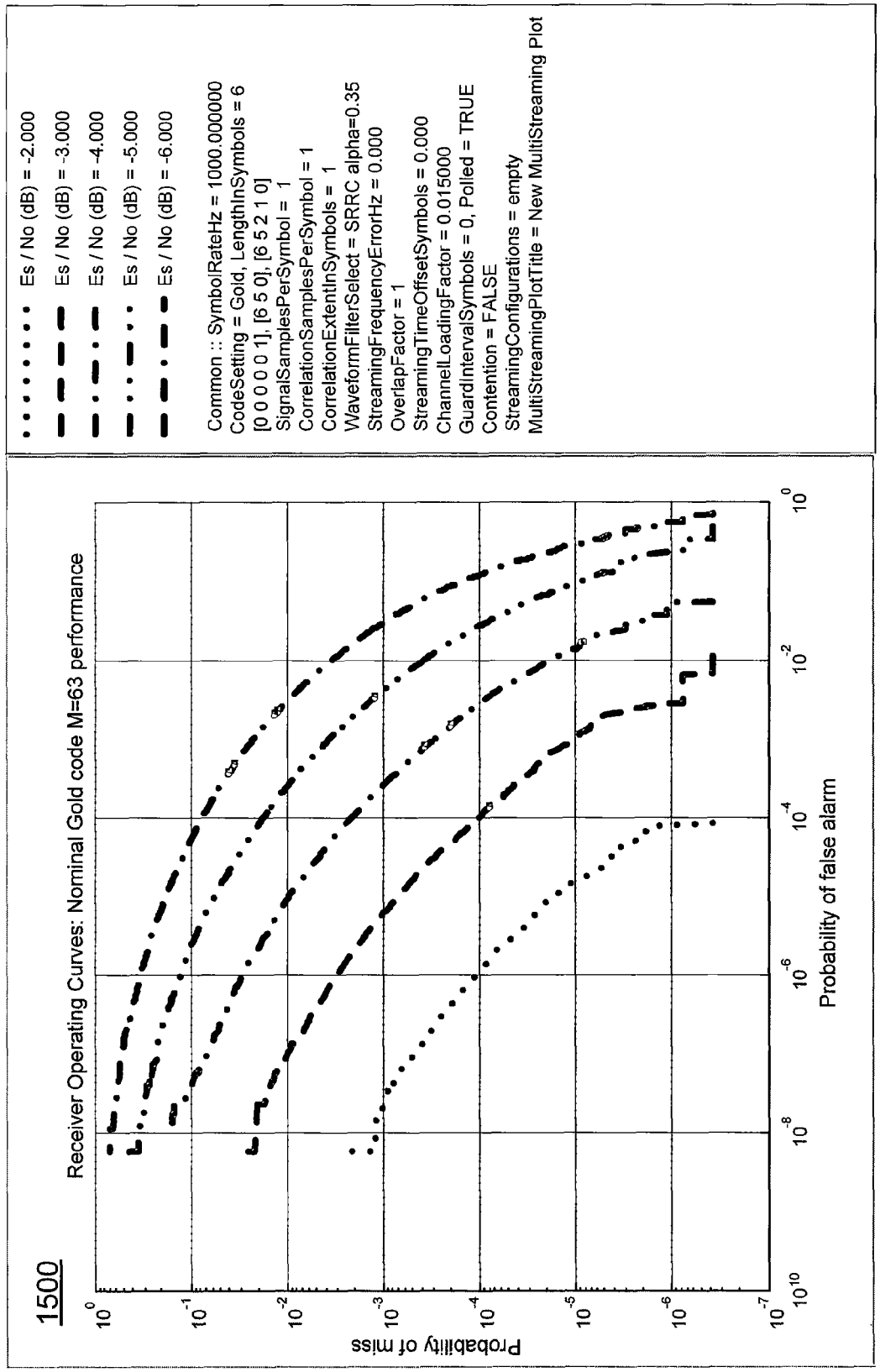
FIG. 15 is a plot of expected envelope detector performance under different noise levels for a 63-chip Gold CDMA code subset of 63 different code words with on-time performance, according to an embodiment of the invention.

FIG. 15 is a plot 1500 of expected envelope detector performance under different noise levels for a 63-chip Gold CDMA code subset (N=6) of 63 different code words with on-time performance, according to an embodiment of the invention. The on-time performance of the 63-chip Gold CDMA code subset is similar to the on-time performance of the 64-chip Walsh CDMA code set shown in FIG. 10.

Figure 16:
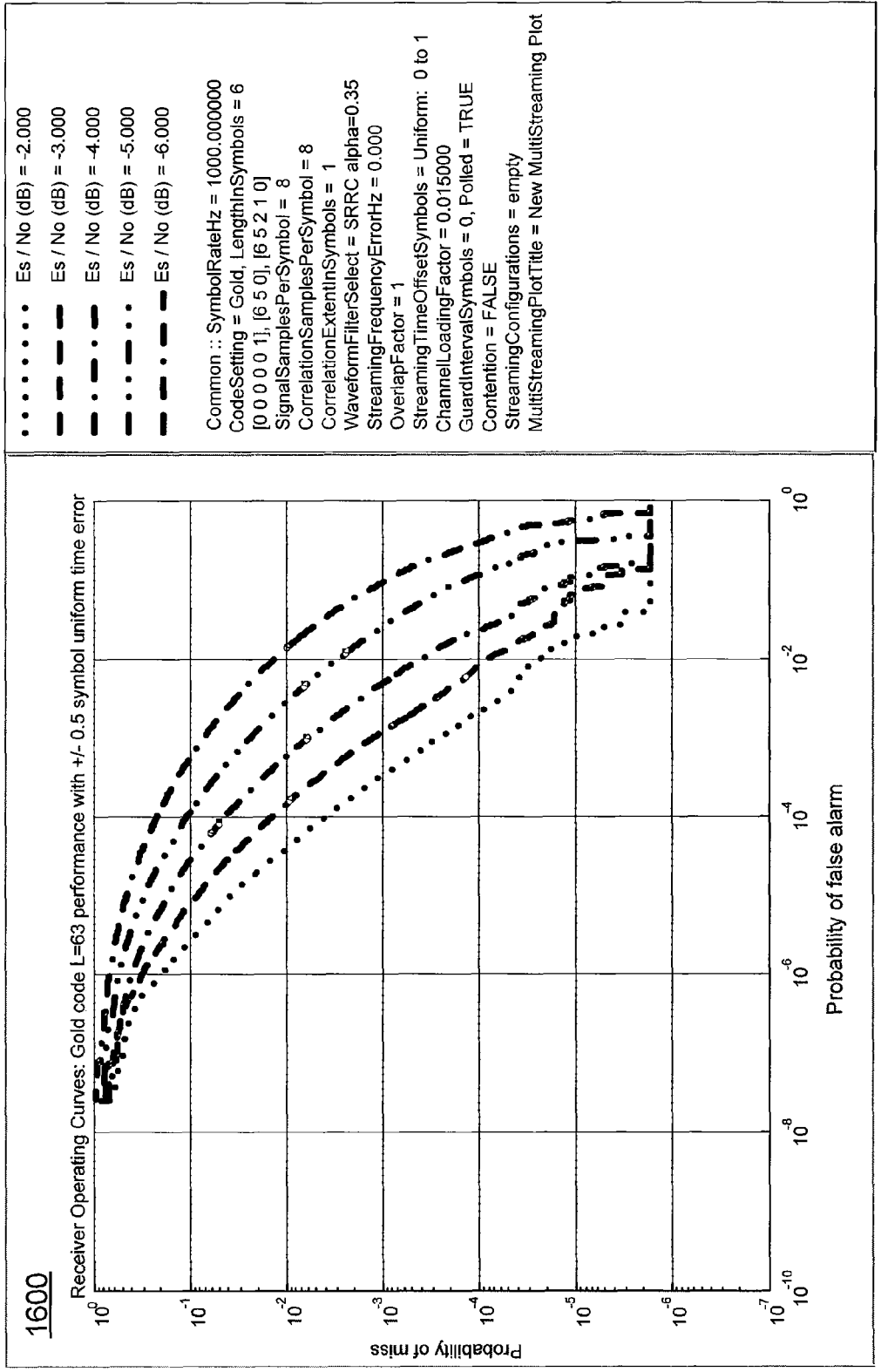
FIG. 16 is a plot of expected envelope detector performance under different noise levels for a 63-chip Gold CDMA code subset of 63 different code words with a time error of +/−0.5 chips, according to an embodiment of the invention.
Figure 17:
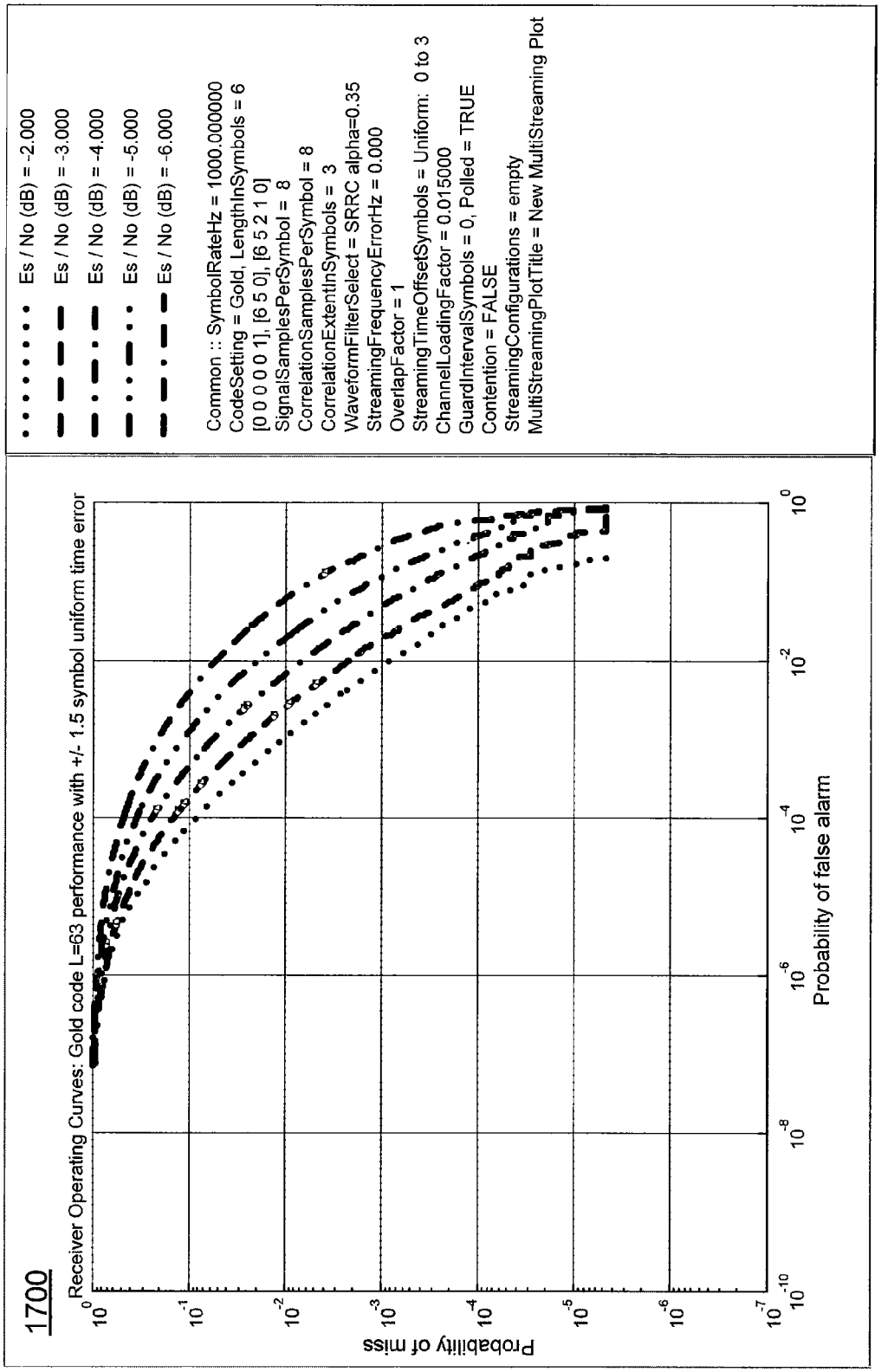
FIG. 17 is a plot of expected envelope detector performance under different noise levels for a 63-chip Gold CDMA code subset of 63 different code words with a time error of +/−1.5 chips, according to an embodiment of the invention.

FIG. 16 is a plot 1600 of expected envelope detector performance under different noise levels for a 63-chip Gold CDMA code subset of 63 different code words with a time error of +/−0.5 chips, according to an embodiment of the invention. As FIG. 16 shows, the performance of the system degrades at time offsets of +/−0.5 chips, although the degradation is less than the 64-chip Walsh CDMA code set shown in FIG. 10. FIG. 17 is a plot of expected envelope detector performance under different noise levels for a 63-chip Gold CDMA code subset of 63 different code words with a time error of +/−1.5 chips, according to an embodiment of the invention. Comparing FIGS. 16 and 17, it is apparent that system performance continues to degrade as the offset increases from +/−0.5 chips to +/−1.5 chips. Similar to Walsh codes, FIGS. 15, 16, and 17 show that Gold code performance degrades with small offsets between codes. Thus, Gold codes would not provide relaxation of time synchronization requirements in a system utilizing CDM reservation requests if the relative time error exceeds a small fraction of a reservation request chip.

LS Codes

Loosely synchronous ("LS") codes are an example of a generalized orthogonal code having a zero correlation window over a range of time errors. The zero correlation window is the spacing in chips between zero, or on-time, and the first non-zero off-time cross correlation value. A zero correlation window provides a range of time errors over which the cross correlation between codes is zero. The construction of LS codes is known in the art. In general, LS codes are constructed recursively, using Golay pairs as a starting value. The construction of a code set with a zero correlation window requires an increase in code length. LS codes are $L=(Z_0*M)+(Z_0-1)$ chips long, where $Z_0$ is used to determine the size of the zero correlation window, and M is the number of different code words in the code set. The zero correlation window is centered around zero, or on-time, and extends $(Z_0-1)$ chips in each direction. For example, for $Z_0=4$, all cross correlation values at offsets of −3, −2, −1, +1, +2, +3 are zero. For LS code sets, $Z_0$ is restricted to values that are a power of two ($Z_0=2^k$). LS codes are constructed by placing ($Z_0-1$) null chips between each pair of binary sequences of length ($Z_0*M$)/2.

Figure 18:
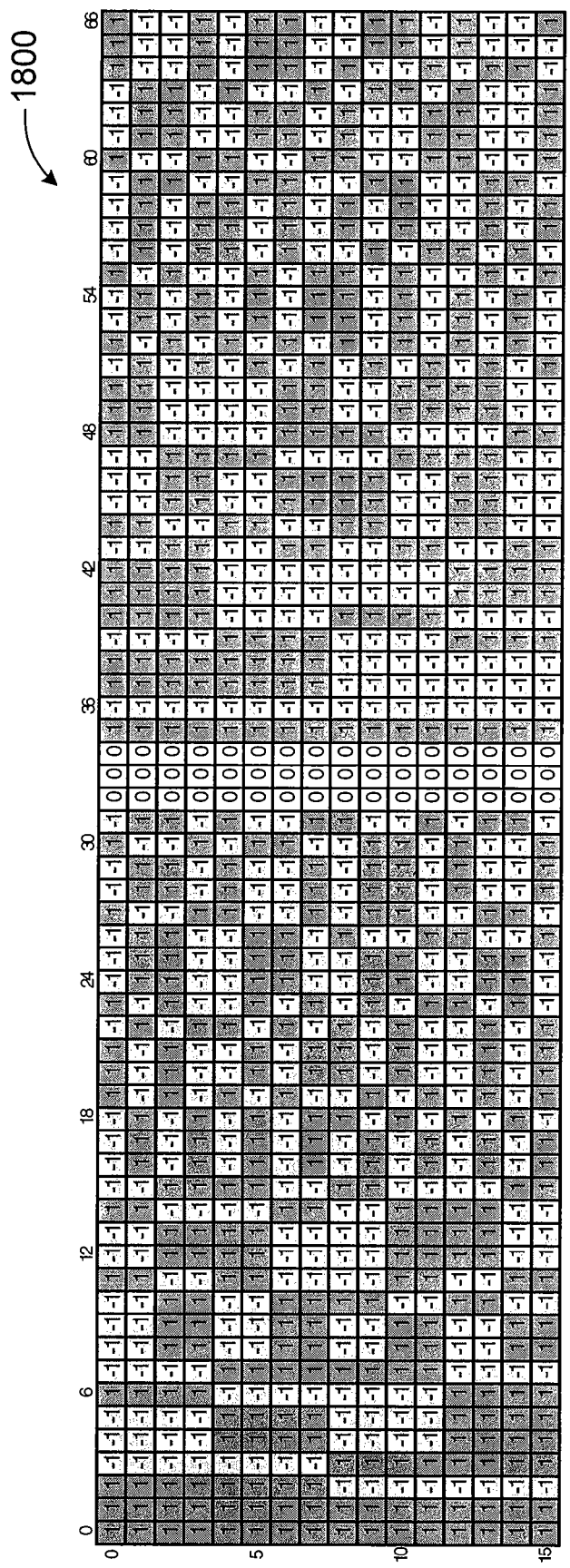
FIG. 18 depicts a 67-chip LS CDMA code set with 16 different possible code words.

As an example, FIG. 18 depicts a 67-chip LS CDMA code set 1800 with 16 different possible code words ($Z_0=4$). Indices 0 through 15 are used to identify the 16 different possible code words. This code set has a zero correlation window extending +/−3 chips from zero.

Figure 19:
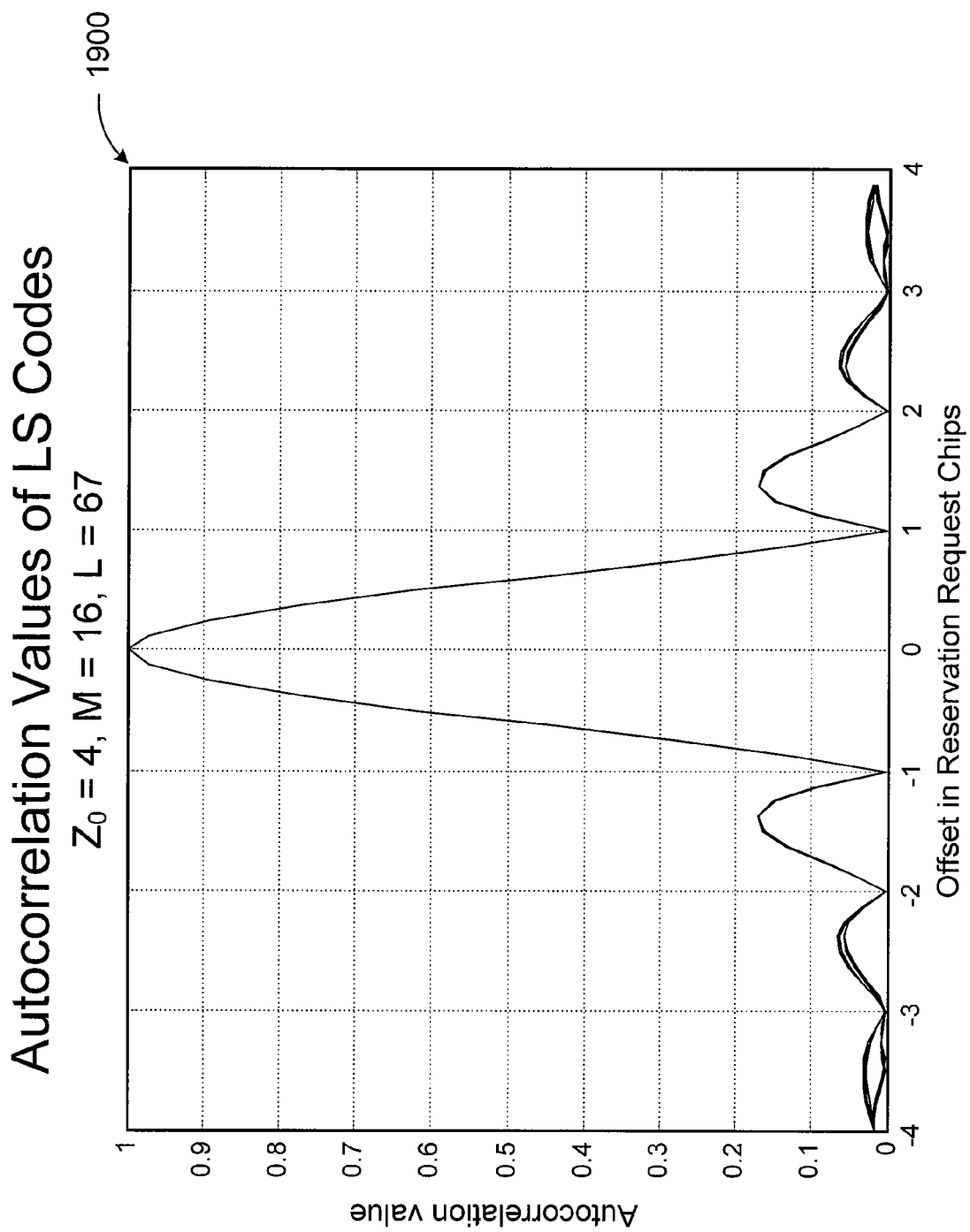
FIG. 19 is a plot of the autocorrelation values for each of the 16 code words in a 67-chip LS CDMA code set, according to an embodiment of the invention.

FIG. 19 is a plot 1900 of the autocorrelation values for each of the 16 code words in a 67-chip LS CDMA code set across a range of offsets measured in reservation request chips, according to an embodiment of the invention. FIG. 19 shows that all on-time autocorrelation values are 1, and all off-time autocorrelation values are zero at offsets of [1, . . . ($Z_0-1$)] chips from on-time (the width of the zero correlation window). The small values between the exact chip times within the zero correlation window are an artifact of square-root-raised-cosine (SRRC) filtering.

Figure 20:
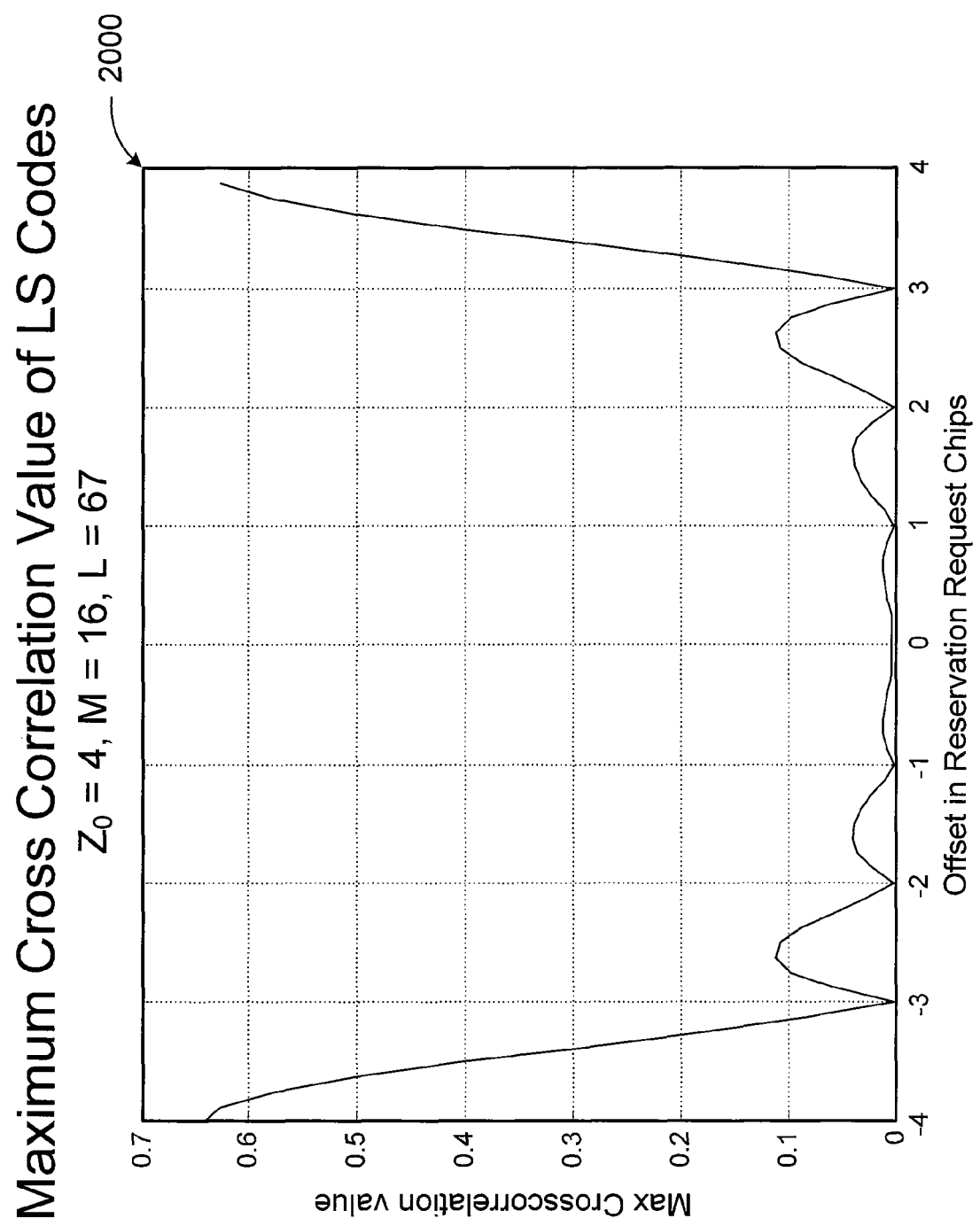
FIG. 20 is a plot of the maximum cross correlation value between each of the 16 code words in a 67-chip LS CDMA code set, according to an embodiment of the invention.

FIG. 20 is a plot 2000 of the maximum cross correlation value between each of the 16 code words in a 67-chip LS CDMA code set, according to an embodiment of the invention. FIG. 20 shows that all on-time cross correlation values are zero, and all off-time autocorrelation values are zero at offsets within the zero correlation window. Again, the small values between the exact chip times within the zero correlation window are an artifact of SRRC filtering.

Figure 21:
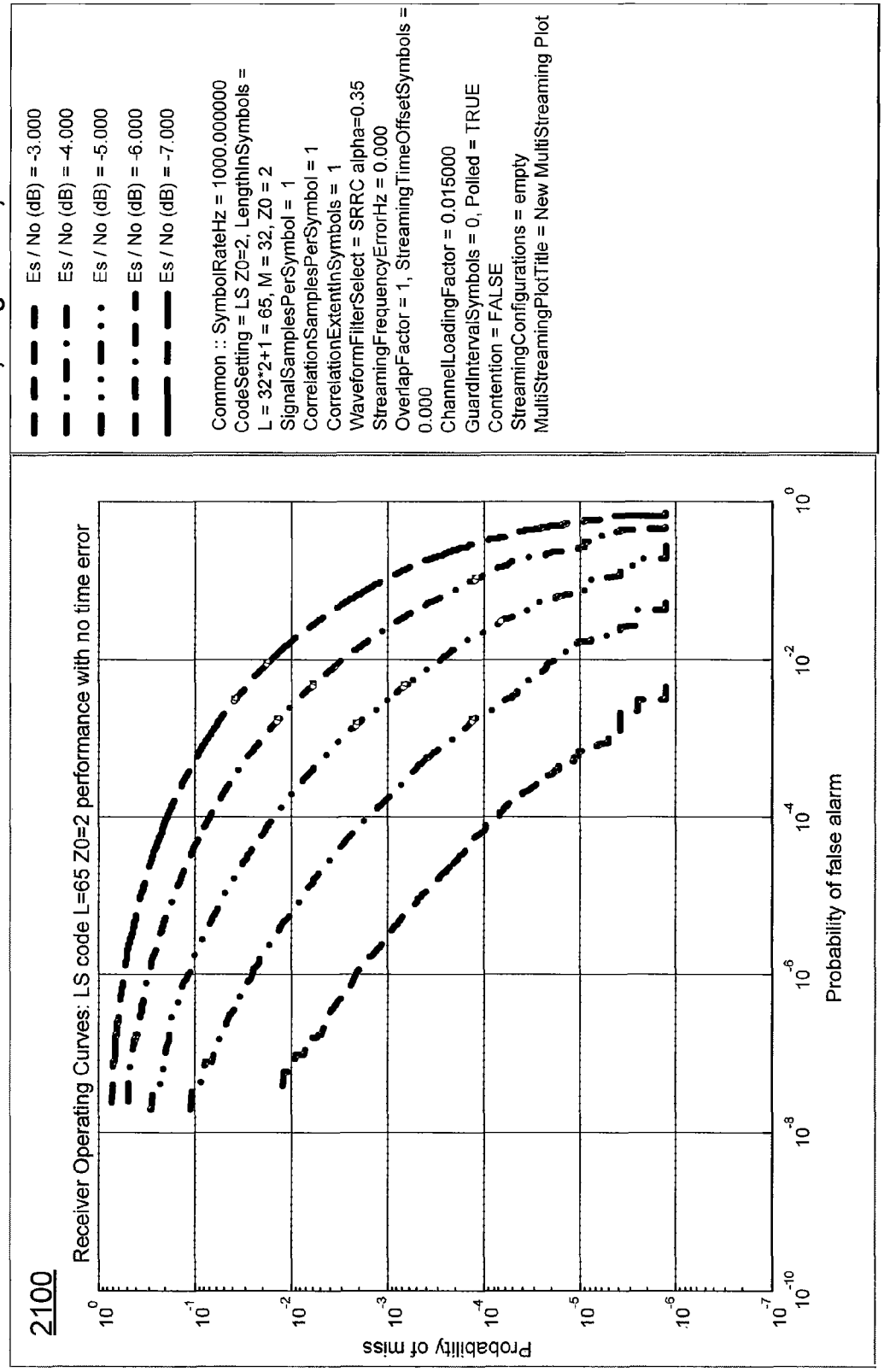
FIG. 21 is a plot of expected envelope detector performance under different noise levels for a 65-chip LS CDMA code set of 32 different code words with on-time performance, according to an embodiment of the invention.

FIG. 21 is a plot 2100 of expected envelope detector performance under different noise levels for a 65-chip LS CDMA code set of 32 different code words ($Z_0=2$) with on-time performance, according to an embodiment of the invention. The on-time performance of the 65-chip LS CDMA code set is similar to the on-time performance of the 64-chip Walsh CDMA code set shown in FIG. 10 (note the noise level, Es/No, ranges from −7.0 to −3.0 in FIG. 21, compared to −6.0 to −2.0 in FIG. 10).

Figure 22:
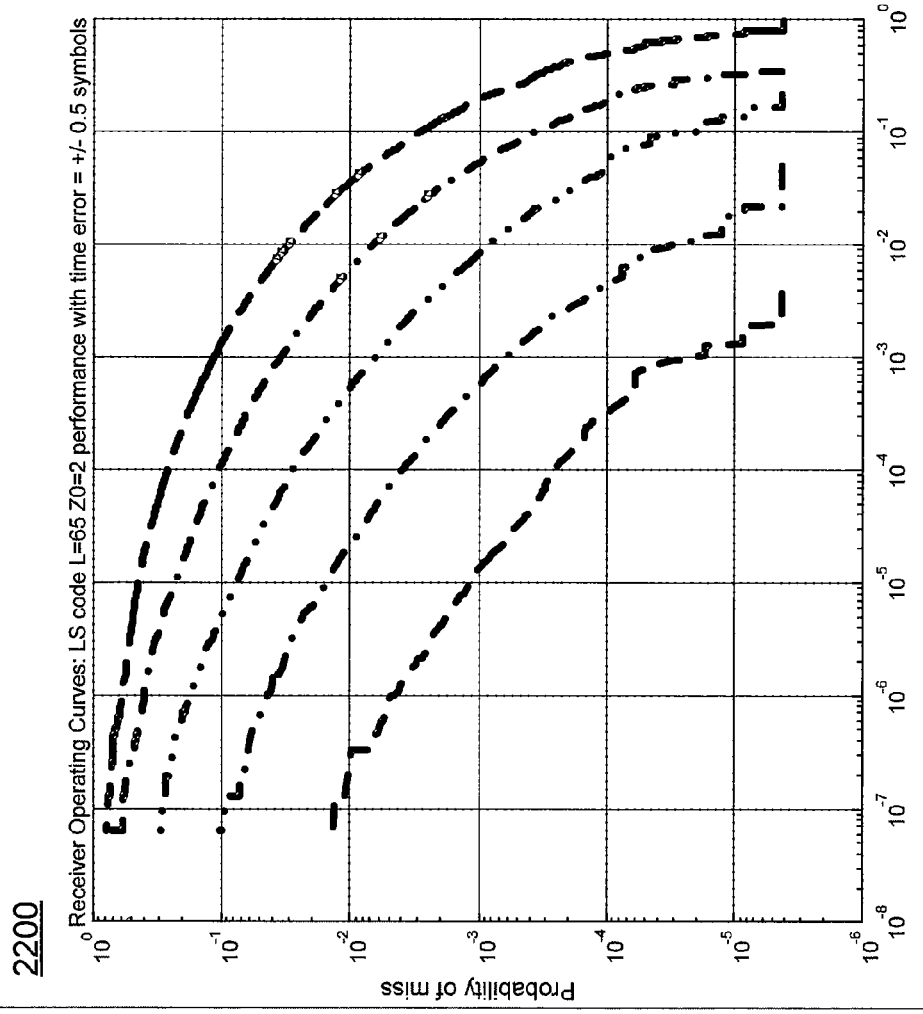
FIG. 22 is a plot of expected envelope detector performance under different noise levels for a 65-chip LS CDMA code set of 32 different code words with a time error of +/−0.5 chips, according to an embodiment of the invention.

FIG. 22 is a plot 2200 of expected envelope detector performance under different noise levels for a 65-chip LS CDMA code set of 32 different code words with a time error of +/−0.5 chips, according to an embodiment of the invention. Despite the +/−0.5 chip offset, FIG. 22 shows only a small performance degradation of approximately ⅓ dB compared to on-time performance.

Figure 23:
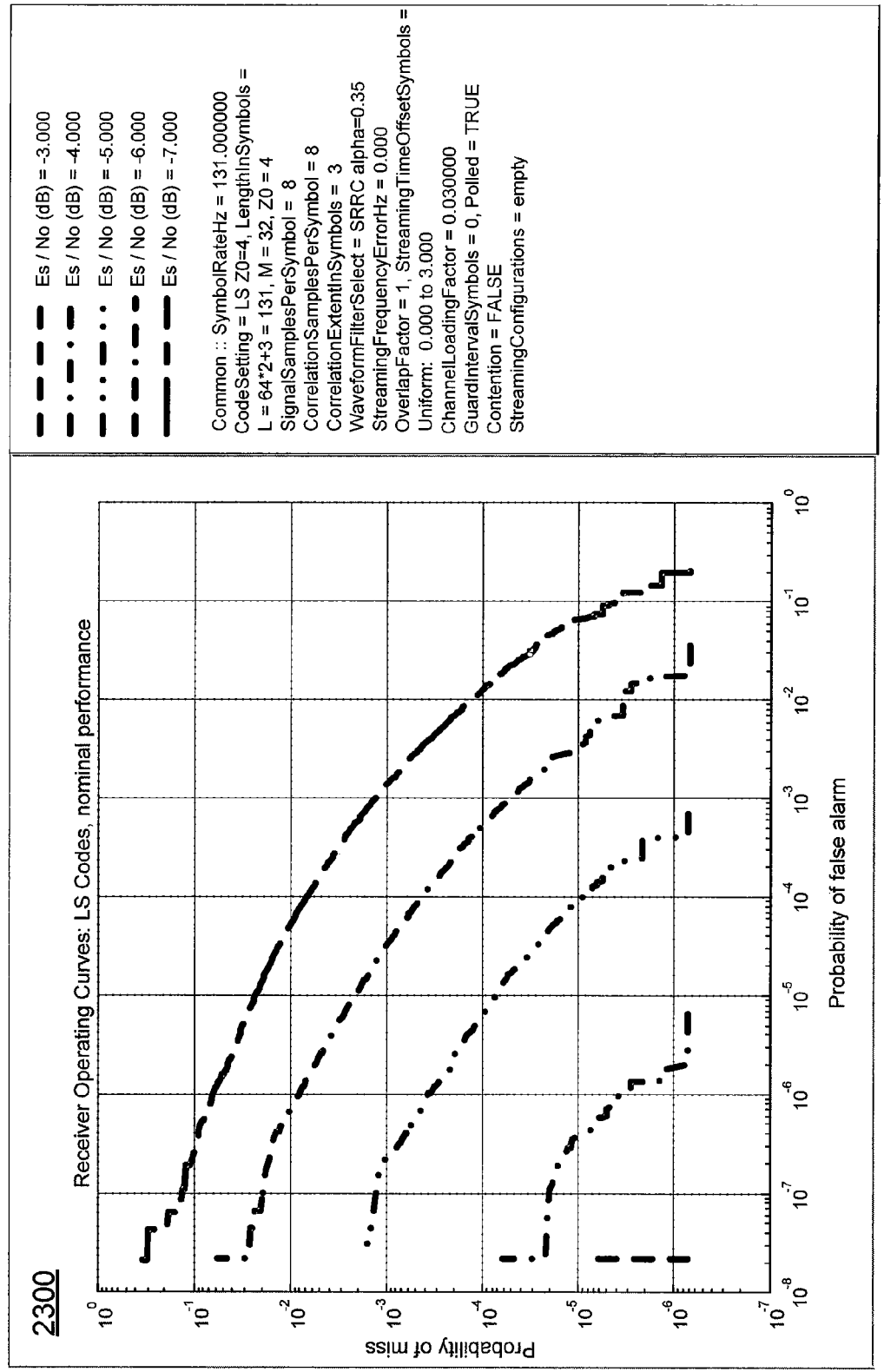
FIG. 23 is a plot of expected envelope detector performance under different noise levels for a 131-chip LS CDMA code set of 32 different code words with on-time performance, according to an embodiment of the invention.

FIG. 23 is a plot 2300 of expected envelope detector performance under different noise levels for a 131-chip LS CDMA code set of 32 different code words ($Z_0=4$) with on-time performance, according to an embodiment of the invention. The on-time performance of the 131-chip LS CDMA code set of 32 different code words is improved over the 64-chip Walsh CDMA code set shown in FIG. 10 (note the noise level, Es/No, ranges from −7.0 to −3.0 in FIG. 23, compared to −6.0 to −2.0 in FIG. 10).

Figure 24:
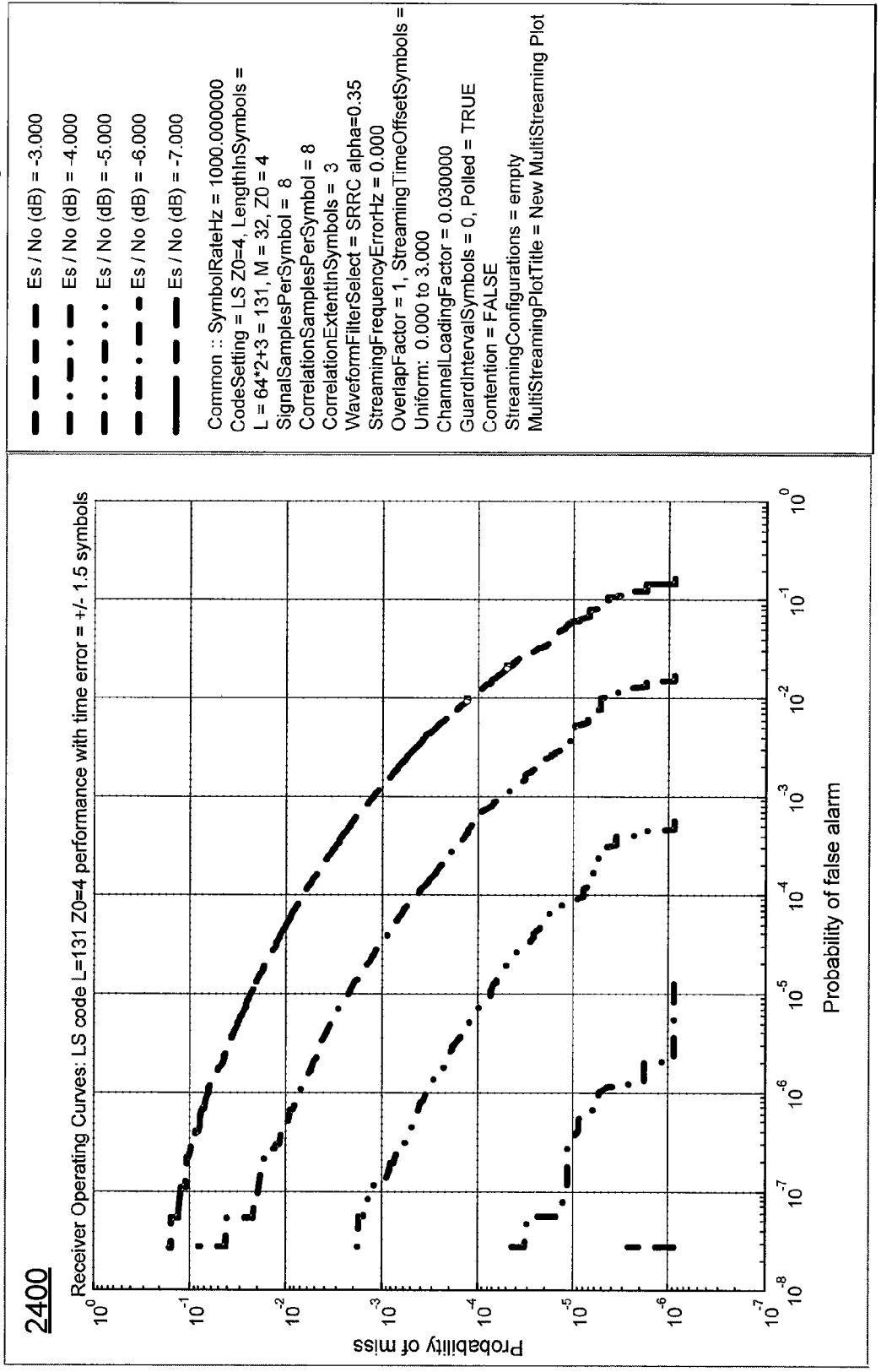
FIG. 24 is a plot of expected envelope detector performance under different noise levels for a 131-chip LS CDMA code set of 32 different code words with a time error of +/−1.5 chips, according to an embodiment of the invention.

FIG. 24 is a plot 2400 of expected envelope detector performance under different noise levels for a 131-chip LS CDMA code set of 32 different code words with a time error of +/−1.5 chips, according to an embodiment of the invention. The plot shows virtually no degradation in performance compared to on-time performance.

Figure 25:
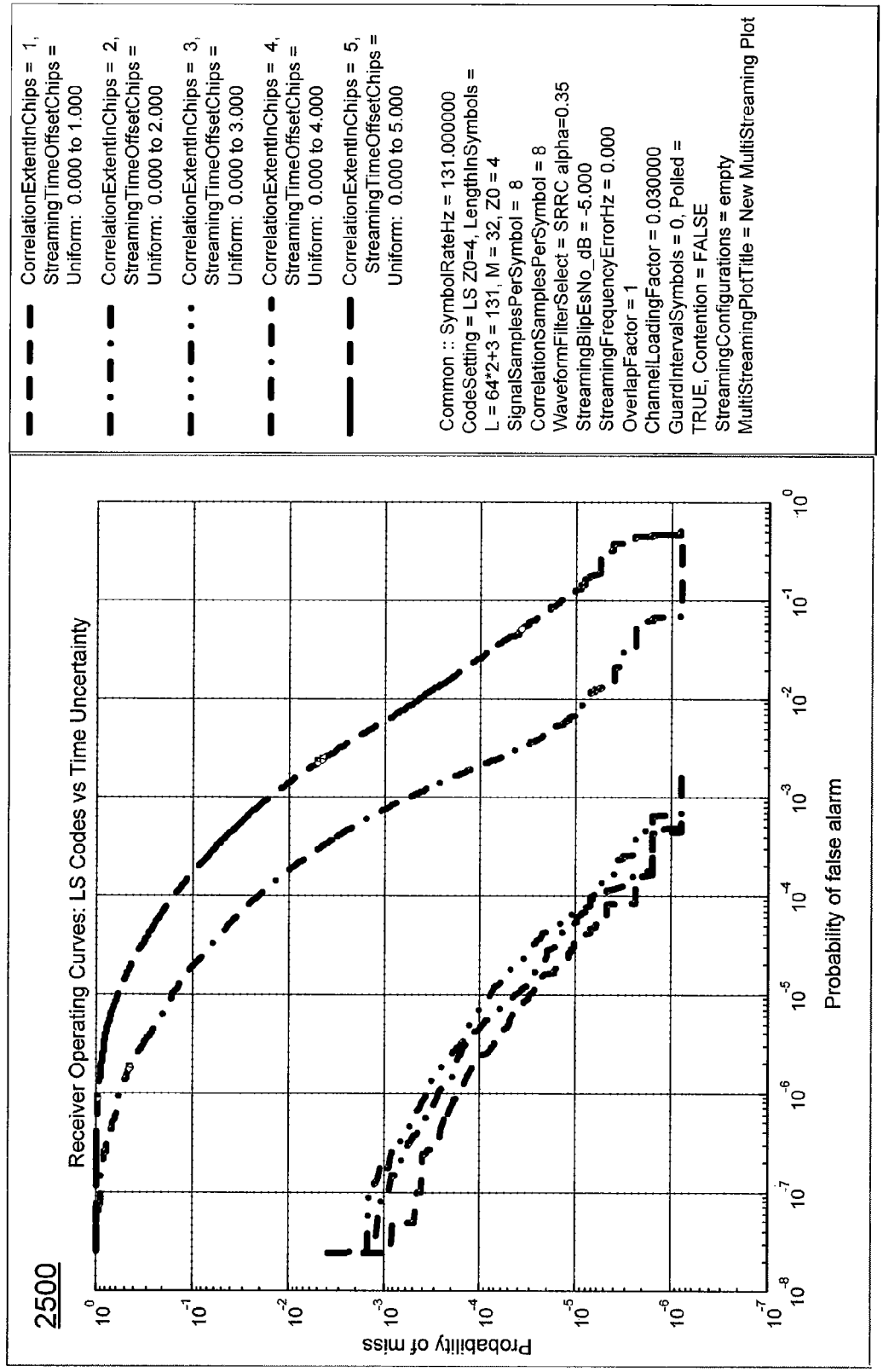
FIG. 25 is a plot of expected envelope detector performance under different time errors for a 131-chip LS CDMA code set of 32 different code words, according to an embodiment of the invention.

FIG. 25 is a plot 2500 of expected envelope detector performance under different time errors for a 131-chip LS CDMA code set of 32 different code words ($Z_0=4$) at a constant noise level of Es/No=−5.0 dB, according to an embodiment of the invention. The width of the zero correlation window is ($Z_0-1$)=3. This plot shows that all time errors within the zero correlation window (−3, −2, −1, +1, +2, +3) show little degradation in performance compared to on-time performance at the same noise level of −5.0 dB shown in FIG. 23.

FIG. 25 shows that the performance of the system degrades for time errors outside the zero correlation window (−5, −4, +4, +5).

Thus, according to an embodiment of the invention, LS codes are used to relax the time synchronization requirements of a system utilizing CDM reservation requests. Such codes allow for separation between codes within a CDM code space if the relative time error is within the zero correlation window.

Sparse Walsh Codes

As another example, Sparse Walsh codes are a generalized orthogonal code that also has a zero correlation window over a range of time errors. Sparse Walsh codes are $L=(Z_0*M)$ chips long, where $Z_0$ is used to determine the size of the zero correlation window, and M is the number of different code words in the code set. The zero correlation window is centered around zero, or on-time, and extends ($Z_0-1$) chips in each direction. Unlike LS codes, however, where $Z_0$ is restricted to values that are a power of two, in Sparse Walsh codes $Z_0$ can be any integer value. Sparse Walsh codes are constructed by placing ($Z_0-1$) null chips between each +/−1 value in a Walsh code set. Because Sparse Walsh codes contain more null chips, request energy is lower than for LS codes.

Figure 26:
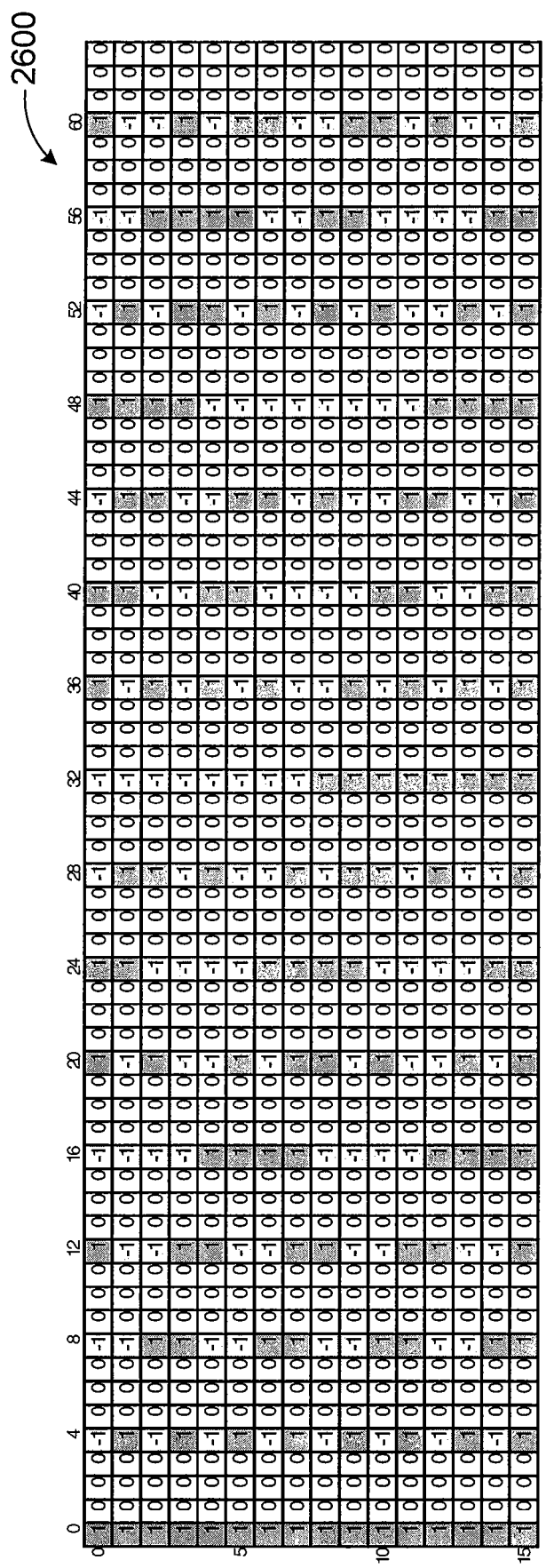
FIG. 26 depicts a 64-chip Sparse Walsh CDMA code set with 16 different possible code words.

As an example, FIG. 26 depicts a 64-chip Sparse Walsh CDMA code set 2600 with 16 different possible code words ($Z_0=4$). Indices 0 through 15 are used to identify the 16 different possible code words. This code set has a zero correlation window extending +/−3 chips from zero.

Figure 27:
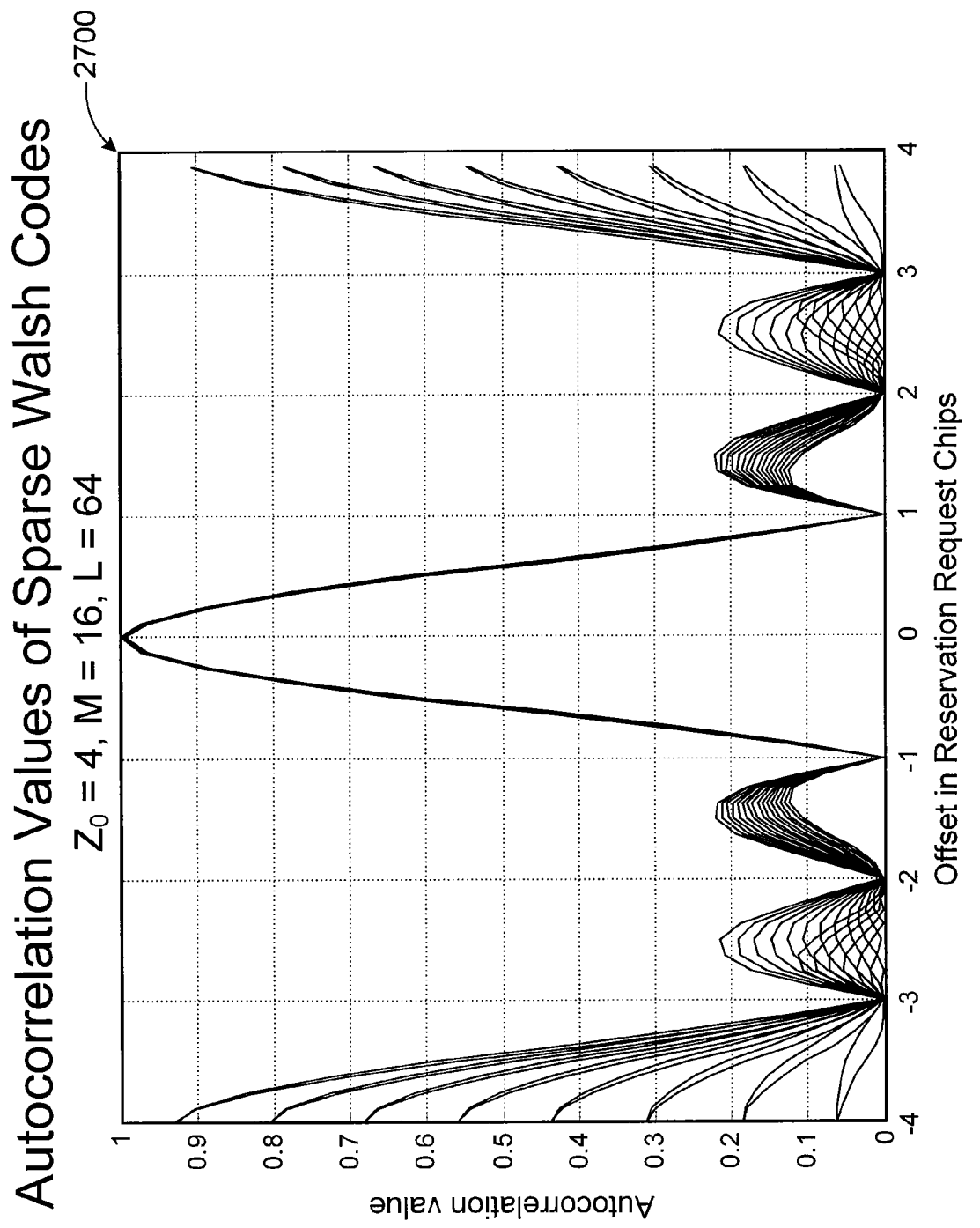
FIG. 27 is a plot of the autocorrelation values for each of the 16 code words in a 64-chip Sparse Walsh CDMA code set, according to an embodiment of the invention.

FIG. 27 is a plot 2700 of the autocorrelation values for each of the 16 code words in a 64-chip Sparse Walsh CDMA code set across a range of offsets measured in reservation request chips, according to an embodiment of the invention. FIG. 27 shows that all on-time autocorrelation values are 1, and all off-time autocorrelation values are zero within the zero correlation window. Again, the small values between the exact chip times within the zero correlation window are an artifact of SRRC filtering.

Figure 28:
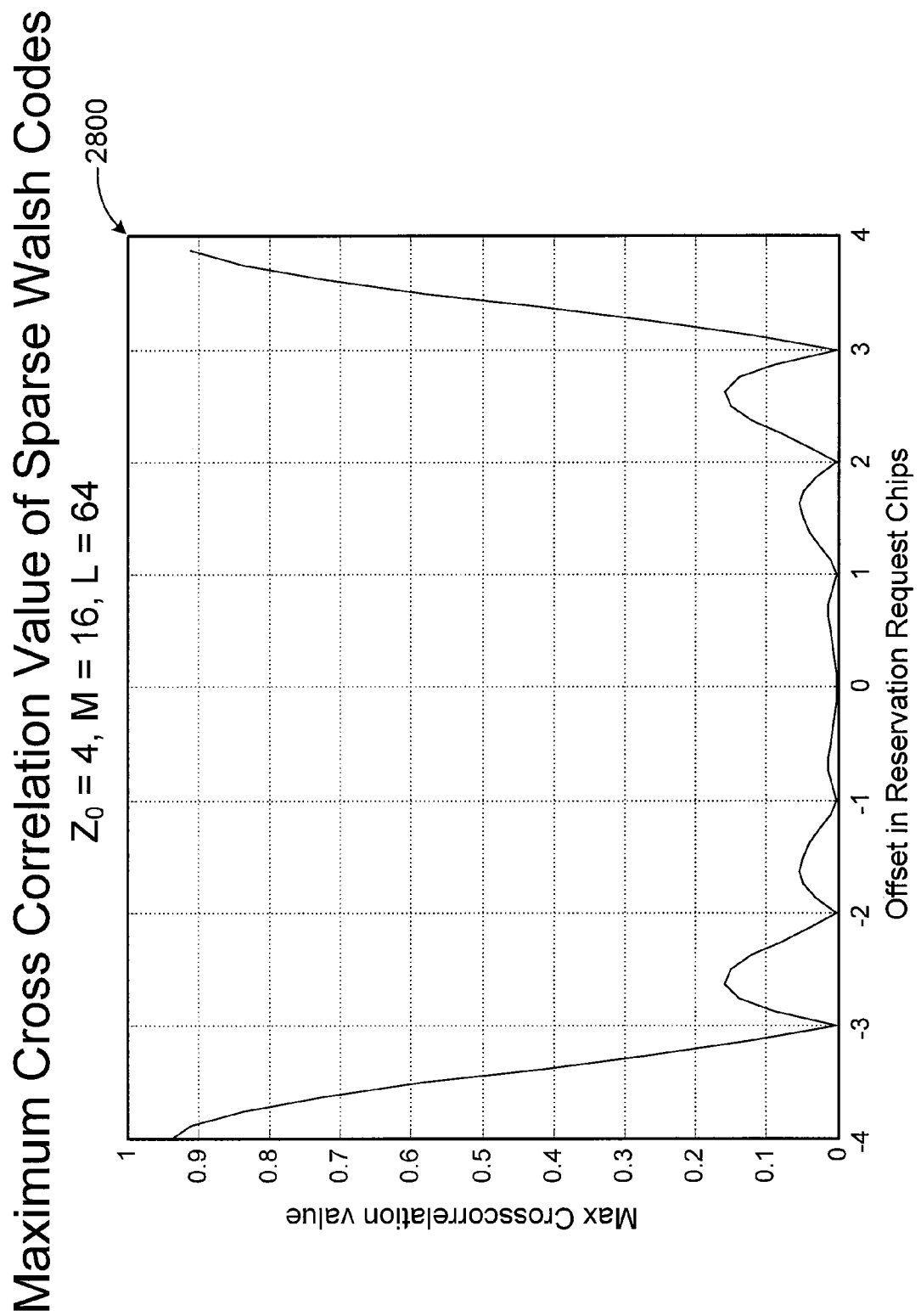
FIG. 28 is a plot of the maximum cross correlation value between each of the 16 code words in a 64-chip Sparse Walsh CDMA code set, according to an embodiment of the invention.

FIG. 28 is a plot 2800 of the maximum cross correlation value between each of the 16 code words in a 64-chip Sparse Walsh CDMA code set, according to an embodiment of the invention. FIG. 28 shows that all on-time cross correlation values are zero, and all off-time cross correlation values are zero at offsets within the zero correlation window. Again, the small values between the exact chip times within the zero correlation window are an artifact of SRRC filtering.

Thus, Sparse Walsh codes would also provide relaxed time synchronization requirements for a system utilizing CDM reservation requests if the relative time error is within the zero correlation window. Other types and lengths of code may also be used in accordance with the invention. As an example, generalized quasi-orthogonal codes, which are constructed to have small cross correlation over a range of time errors, may also be used to provide relaxed time synchronization requirements for a system utilizing CDM reservation requests in accordance some embodiments of the invention.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for communicating using a shared communication medium comprising:
sending a request for a data traffic transmission opportunity, the shared communication medium organized to include a request signal space and a scheduled transmission signal space, the request signal space utilizing a set of code sequences each corresponding to a different location within the request signal space, the scheduled transmission signal space including a plurality of scheduled data transmission segments each having a different location within the scheduled transmission signal space, the request sent using a code sequence that is a member of the set of code sequences, each member characterized by an autocorrelation function having a peak centered at a zero time offset, each member further characterized by a cross correlation function defined with respect to each other member, the cross correlation function having a correlation window having a width and surrounding a zero time offset;
receiving an assignment for assigning the request to the data traffic transmission opportunity in the scheduled transmission signal space, the assignment made in response to detecting the code sequence from a plurality of code sequences having relative timing offsets less than the width of the correlation window; and
sending a data traffic transmission using the assigned data traffic transmission opportunity in the scheduled transmission signal space.

2. The method of claim 1 wherein the set of code sequences corresponds to a generalized orthogonal code set, wherein the cross correlation function with respect to each other member of the set of code sequences is zero if the relative timing offsets are less than the width of the correlation window.

3. The method of claim 1 wherein the set of code sequences corresponds to a generalized quasi-orthogonal code set, wherein the cross correlation function with respect to each other member of the set of code sequences is greater than zero if the relative timing offsets are greater than zero and less than the width of the correlation window.

4. The method of claim 1 wherein the width of the correlation window is determined by a length of the code sequence and a number of members in the set of code sequences.

5. The method of claim 4 wherein the length of the code sequence and the number of members in the set of code sequences are selected so that the relative timing offsets of the plurality of code sequences are less than the width of the correlation window.

6. A method for communicating using a shared communication medium involving a plurality of nodes including a first node and a second node, the method comprising:
at the second node, receiving a request from the first node for a data traffic transmission opportunity, the shared communication medium organized to include a request signal space and a scheduled transmission signal space, the request signal space utilizing a set of code sequences each corresponding to a different location within the request signal space, the scheduled transmission signal space including a plurality of scheduled data transmission segments each having a different location within the scheduled transmission signal space, the request sent using a code sequence that is a member of the set of code sequences, each member characterized by an autocorrelation function having a peak centered at a zero time offset, each member further characterized by a cross correlation function defined with respect to each other member, the cross correlation function having a correlation window having a width and surrounding a zero time offset;
at the second node, sending an assignment for assigning the request to the data traffic transmission opportunity in the scheduled transmission signal space, the assignment made in response to detecting the code sequence from a plurality of code sequences having relative timing offsets less than the width of the correlation window; and
at the second node, receiving a data traffic transmission using the assigned data traffic transmission opportunity in the scheduled transmission signal space.

7. The method of claim 6 wherein the set of code sequences corresponds to a generalized orthogonal code set, wherein the cross correlation function with respect to each other member of the set of code sequences is zero if the relative timing offsets are less than the width of the correlation window.

8. The method of claim 6 wherein the set of code sequences corresponds to a generalized quasi-orthogonal code set, wherein the cross correlation function with respect to each other member of the set of code sequences is greater than zero if the relative timing offsets are greater than zero and less than the width of the correlation window.

9. The method of claim 6 wherein the width of the correlation window is determined by a length of the code sequence and a number of members in the set of code sequences.

10. The method of claim 9 wherein the length of the code sequence and the number of members in the set of code sequences are selected so that the relative timing offsets of the plurality of code sequences are less than the width of the correlation window.

11. An apparatus for communicating using a shared communication medium comprising:
a first node configured to send a request for a data traffic transmission opportunity, the shared communication medium organized to include a request signal space and a scheduled transmission signal space, the request signal space utilizing a set of code sequences each corresponding to a different location within the request signal space, the scheduled transmission signal space including a plurality of scheduled data transmission segments each having a different location within the scheduled transmission signal space, the first node configured to send the request using a code sequence that is a member of the set of code sequences, each member characterized by an autocorrelation function having a peak centered at a zero time offset, each member further characterized by a cross correlation function defined with respect to each other member, the cross correlation function having a correlation window having a width and surrounding a zero time offset;
wherein the first node is configured to receive an assignment for assigning the request to the data traffic transmission opportunity in the scheduled transmission signal space, the assignment made in response to detecting the code sequence from a plurality of code sequences having relative timing offsets less than the width of the correlation window; and
wherein the first node is configured to send a data traffic transmission using the assigned data traffic transmission opportunity in the scheduled transmission signal space.

12. The apparatus of claim 11 wherein the set of code sequences corresponds to a generalized orthogonal code set, wherein the cross correlation function with respect to each other member of the set of code sequences is zero if the relative timing offsets are less than the width of the correlation window.

13. The apparatus of claim 11 wherein the set of code sequences corresponds to a generalized quasi-orthogonal code set, wherein the cross correlation function with respect to each other member of the set of code sequences is greater than zero if the relative timing offsets are greater than zero and less than the width of the correlation window.

14. The apparatus of claim 11 wherein the width of the correlation window is determined by a length of the code sequence and a number of members in the set of code sequences.

15. The apparatus of claim 14 wherein the length of the code sequence and the number of members in the set of code sequences are selected so that the relative timing offsets of the plurality of code sequences are less than the width of the correlation window.

16. An apparatus for communicating using a shared communication medium comprising:

a second node configured to receive a request from a first node for a data traffic transmission opportunity, the shared communication medium organized to include a request signal space and a scheduled transmission signal space, the request signal space utilizing a set of code sequences each corresponding to a different location within the request signal space, the scheduled transmission signal space including a plurality of scheduled data transmission segments each having a different location within the scheduled transmission signal space, the second node configured to receive the request using a code sequence that is a member of the set of code sequences, each member characterized by an autocorrelation function having a peak centered at a zero time offset, each member further characterized by a cross correlation function defined with respect to each other member, the cross correlation function having a correlation window having a width and surrounding a zero time offset;

wherein the second node is configured to send an assignment for assigning the request to the data traffic transmission opportunity in the scheduled transmission signal space, the assignment made in response to detecting the code sequence from a plurality of code sequences having relative timing offsets less than the width of the correlation window; and wherein the second node is configured to receive a data traffic transmission from the first node using the assigned data traffic transmission opportunity in the scheduled transmission signal space.

17. The apparatus of claim 16 wherein the set of code sequences corresponds to a generalized orthogonal code set, wherein the cross correlation function with respect to each other member of the set of code sequences is zero if the relative timing offsets are less than the width of the correlation window.

18. The apparatus of claim 16 wherein the set of code sequences corresponds to a generalized quasi-orthogonal code set, wherein the cross correlation function with respect to each other member of the set of code sequences is greater than zero if the relative timing offsets are greater than zero and less than the width of the correlation window.

19. The apparatus of claim 16 wherein the width of the correlation window is determined by a length of the code sequence and a number of members in the set of code sequences.

20. The apparatus of claim 19 wherein the length of the code sequence and the number of members in the set of code sequences are selected so that the relative timing offsets of the plurality of code sequences are less than the width of the correlation window.

* * * * *